United States Patent
Kawamoto et al.

(10) Patent No.: US 9,607,173 B2
(45) Date of Patent: Mar. 28, 2017

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Yohei Kawamoto, Tokyo (JP); Taizo Shirai, Kanagawa (JP); Yu Tanaka, Tokyo (JP); Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 14/663,789

(22) Filed: Mar. 20, 2015

(65) Prior Publication Data
US 2015/0278547 A1   Oct. 1, 2015

(30) Foreign Application Priority Data

Mar. 31, 2014   (JP) ................. 2014-073262

(51) Int. Cl.
| | | |
|---|---|---|
| *G06F 21/72* | (2013.01) | |
| *H04L 9/00* | (2006.01) | |
| *G06F 21/62* | (2013.01) | |
| *G06F 9/00* | (2006.01) | |
| *H04L 9/08* | (2006.01) | |

(52) U.S. Cl.
CPC ............ *G06F 21/6245* (2013.01); *G06F 9/00* (2013.01); *G06F 21/6272* (2013.01); *H04L 9/085* (2013.01); *H04L 2209/46* (2013.01); *H04L 2209/88* (2013.01)

(58) Field of Classification Search
CPC ............................ G06F 21/6245; G06F 21/70
See application file for complete search history.

(56) References Cited

U.S. PATENT DOCUMENTS

2014/0372769 A1* 12/2014 Kerschbaum ........... H04L 9/008
713/189

* cited by examiner

*Primary Examiner* — Izunna Okeke
(74) *Attorney, Agent, or Firm* — Chip Law Group

(57) ABSTRACT

There is provided an information processing apparatus including a first computation protocol generation unit configured to generate a first computation protocol that does not include a confidentiality securing protocol that is executed in order to maintain confidentiality of a plurality of input values on the basis of a secure computation protocol in which a plurality of operation processing apparatuses compute an output value on the basis of the input values, and a second computation protocol generation unit configured to generate a second computation protocol by arranging the confidentiality securing protocol to a position at which the confidentiality is secured in the first computation protocol.

17 Claims, 14 Drawing Sheets

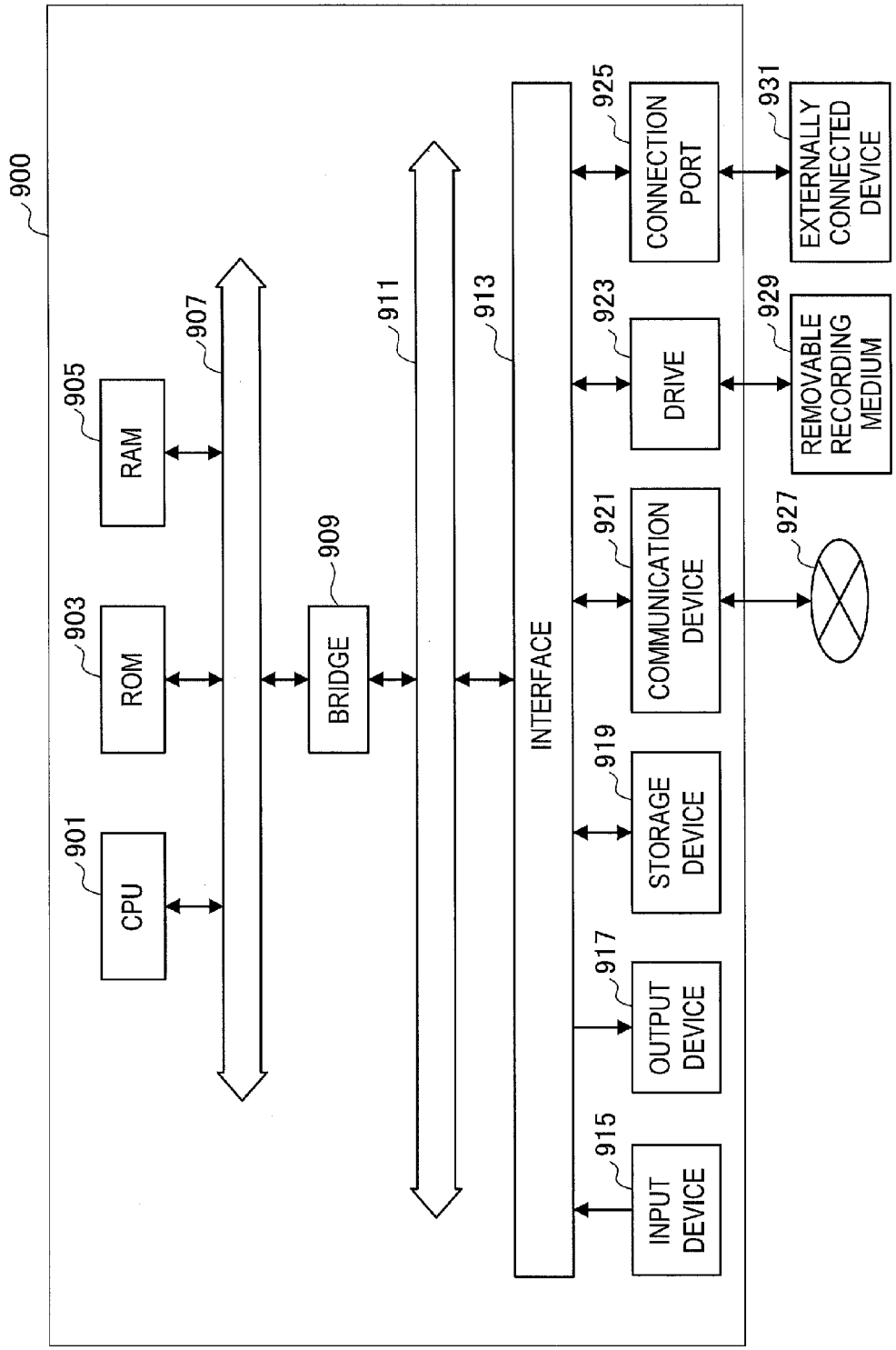

INFORMATION PROCESSING APPARATUS, INFORMATION PROCESSING METHOD, AND RECORDING MEDIUM

CROSS REFERENCE TO RELATED APPLICATIONS

This application claims the benefit of Japanese Priority Patent Application JP 2014-073262 filed Mar. 31, 2014, the entire contents of which are incorporated herein by reference.

BACKGROUND

The present disclosure relates to information processing apparatuses, information processing methods, and recording media.

In recent years, there has been proposed a technique of providing more convenient service for uses by using personal data of users. However, such a service might possibly leak privacy information of users, which should be kept confidential, when integrating and analyzing personal data of users. Accordingly, as a technique that accomplishes both the prevention of leak of privacy information of users and the use of personal data, a technique called secure computation protocol (secure computation procedure), a secret computation protocol, or the like is attracting attention.

In the secure computation protocol, it is possible to execute computation by cooperation of a plurality of entities (computation parties) on the basis of a plurality of input values without disclosing the input values to the other parties, and to obtain an output value that corresponds to a certain computation expression. Accordingly, by handling personal data of users as the input values and executing the secure computation protocol, it becomes possible to obtain as the output value various pieces of information that can be derived from the personal data, without disclosing the personal data of users, which is the input values, to each computation party.

As a tool for executing the secure computation protocol, Non-Patent Document 1 (High-performance secure multi-party computation for data mining applications, Dan Bogdanov, Margus Niitsoo, Tomas Toft, Jan Willemson, International Journal of Information Security, November 2012, volume 11, Issue 6, pp. 403-418.) discloses a technique that enables more speedy execution of the secure computation protocol by limiting the number of the computation parties to three and limiting the operation to 32-bit operation, for example.

SUMMARY

Here, in the technique in Non-Patent Document 1, a computation expression used in a secure computation protocol is expressed by the combination of an addition protocol and a multiplication protocol, which are protocols corresponding to basic operation processing (hereinafter such a protocol is also referred to as basic operation protocol). Accordingly, the computation expression can be configured from basic operation protocols (addition protocol and multiplication protocol), and an operation time in the secure computation protocol is a product obtained by multiplying the number of basic operation protocols by the operation time of each of the basic operation protocols. Hence, depending on the content of the computation expression, the execution of the secure computation protocol might take an enormous time.

Accordingly, the present disclosure proposes a novel and improved information processing apparatus, information processing method, and recording medium which can shorten the execution time of the secure computation protocol.

According to an embodiment of the present disclosure, there is provided an information processing apparatus including a first computation protocol generation unit configured to generate a first computation protocol that does not include a confidentiality securing protocol that is executed in order to maintain confidentiality of a plurality of input values on the basis of a secure computation protocol in which a plurality of operation processing apparatuses compute an output value on the basis of the input values, and a second computation protocol generation unit configured to generate a second computation protocol by arranging the confidentiality securing protocol to a position at which the confidentiality is secured in the first computation protocol.

According to another embodiment of the present disclosure, there is provided an information processing method including generating, by a processor, a first computation protocol that does not include a confidentiality securing protocol that is executed in order to maintain confidentiality of a plurality of input values on the basis of a secure computation protocol in which a plurality of operation processing apparatuses compute an output value on the basis of the input values, and generating, by a processor, a second computation protocol by arranging the confidentiality securing protocol to a position at which the confidentiality is secured in the first computation protocol.

According to another embodiment of the present disclosure, there is provided a recording medium having a program recorded thereon for causing a processor of a computer to execute a function of generating a first computation protocol that does not include a confidentiality securing protocol that is executed in order to maintain confidentiality of a plurality of input values on the basis of a secure computation protocol in which a plurality of operation processing apparatuses compute an output value on the basis of the input values, and a function of generating a second computation protocol by arranging the confidentiality securing protocol to a position at which the confidentiality is secured in the first computation protocol.

According to one or more embodiments of the present disclosure, in the secure computation protocol, the first computation protocol that does not include the confidentiality securing protocol for maintaining the confidentiality of the input values is generated or the confidentiality securing protocol is re-arranged to a position at which the confidentiality of the input values is secured in the first computation protocol; thus, the second computation protocol is generated. Accordingly, the second computation protocol can be a secure computation protocol from which a surplus confidentiality securing protocol is removed and the confidentiality securing protocol is arranged at an appropriate position. Hence, it becomes possible to shorten the execution time of the secure computation protocol while the confidentiality of the input values is secured.

As described above, according to one or more of embodiments of the present disclosure, it becomes possible to shorten the execution time of the secure computation protocol. Note that the effects described above are not limiting. That is, the technology according to the present disclosure can exhibit any of the effects described in the specification or other effects that are apparent from the descriptions in the specification, along with the above effects or instead of the above effects.

BRIEF DESCRIPTION OF THE DRAWINGS

FIG. 14 is a functional block diagram showing an example of a hardware configuration of an information processing apparatus according to an embodiment.

DETAILED DESCRIPTION OF THE EMBODIMENT(S)

Figure 1:
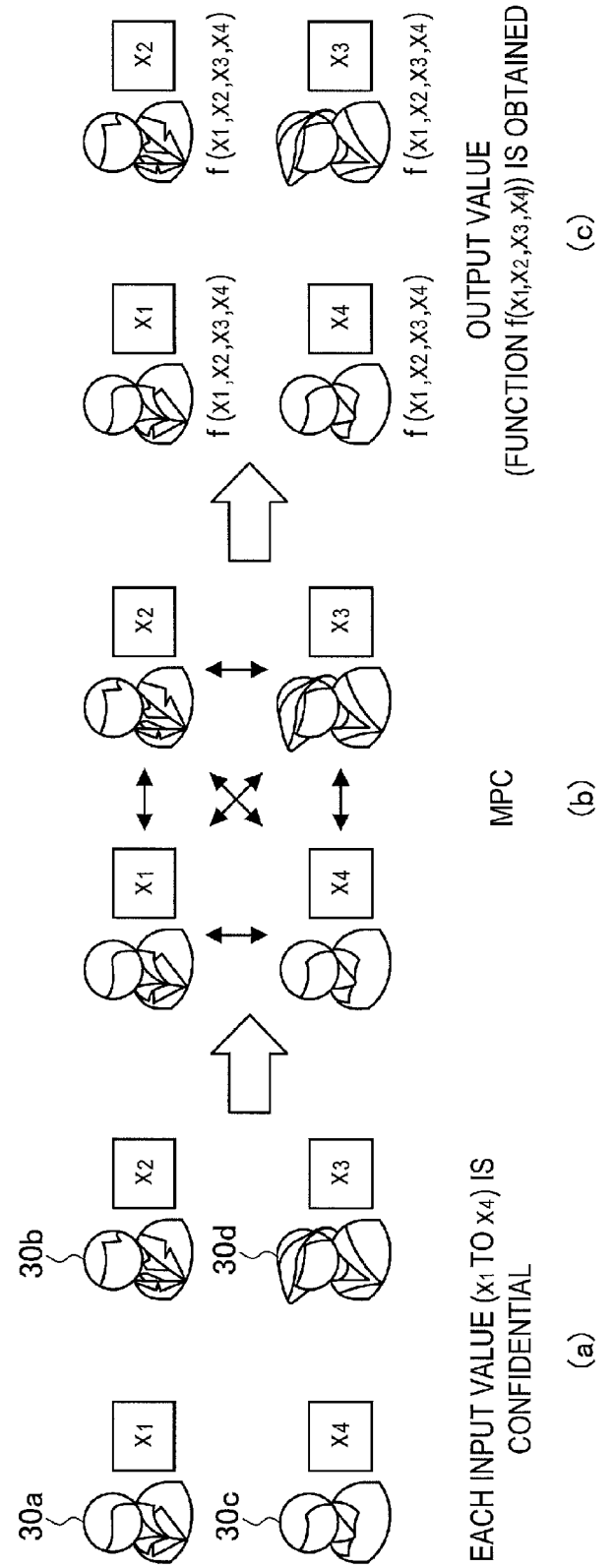
FIG. 1 shows an outline of a secure computation protocol.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Secure computation protocol
    1-1. Outline of secure computation protocol
    1-2. Processing procedure of secure computation protocol
    1-3. System configuration
2. Common secure computation protocol
    2-1. Details of common secure computation protocol
    2-2. Study on common secure computation protocol
3. Configuration of information processing apparatus
4. Processing procedure of information processing method
    4-1. Outline of information processing method
    4-2. Details of information processing method
5. Application examples
    5-1. Secondary use of medical information
        5-1-1. Data mining based on medical information
        5-1-2. Statistical analysis processing of medical information
    5-2. Recommend service
    5-3. Auction
6. Hardware configuration
7. Protocols
8. Supplemental remarks

1. Secure Computation Protocol (1-1. Outline of Secure Computation Protocol)

First, an outline of a secure computation protocol according to an embodiment of the present disclosure will be described with reference to FIG. 1. FIG. 1 shows the outline of the secure computation protocol.

In the secure computation protocol, a plurality of entities (computation parties) cooperate with each other to execute computation without disclosing input values to each other, and eventually obtain an output value corresponding to a certain computation expression. The secure computation protocol is also called multi-party computation (MPC). By use of the secure computation protocol, for example, in a case of comparing assets of two parties with each other, it becomes possible to execute computation using information of the two parties without disclosing their assets to determine either of them has the larger asset, for example, while the information of the two parties is kept confidential.

For example, in an example shown in FIG. 1, four computation parties 30a to 30d that execute computations have four mutually different input values $x_1$ to $x_4$ ((a) in FIG. 1). The input values $x_1$ to $x_4$ are kept confidential from one another of the parties. Hereinafter, the input values inputted to the secure computation protocol are also called secret input values to be differentiated from other input values. Note that although FIG. 1 shows the computation parties 30a to 30d as humans schematically, the computation parties 30a to 30d may be actually achieved by operation processing apparatuses that can execute various operations.

In this state, the computation parties 30a to 30d cooperate with each other to execute the secure computation protocol ((b) in FIG. 1). In the secure computation protocol, information used for computation may be communicated among the computation parties 30a to 30d. Specifically, computation is executed in a manner that each of the computation parties 30a to 30d is not allowed to know the input values $x_1$ to $x_4$ other than his/her own input value. After the execution of the secure computation protocol, in a state in which each of the input values $x_1$ to $x_4$ is kept confidential from each of the computation parties 30a to 30d, a function $f(x_1,x_2,x_3,x_4)$ is obtained as a final output value ((c) in FIG. 1).

(1-2. Processing Procedure of Secure Computation Protocol)

Figure 2:
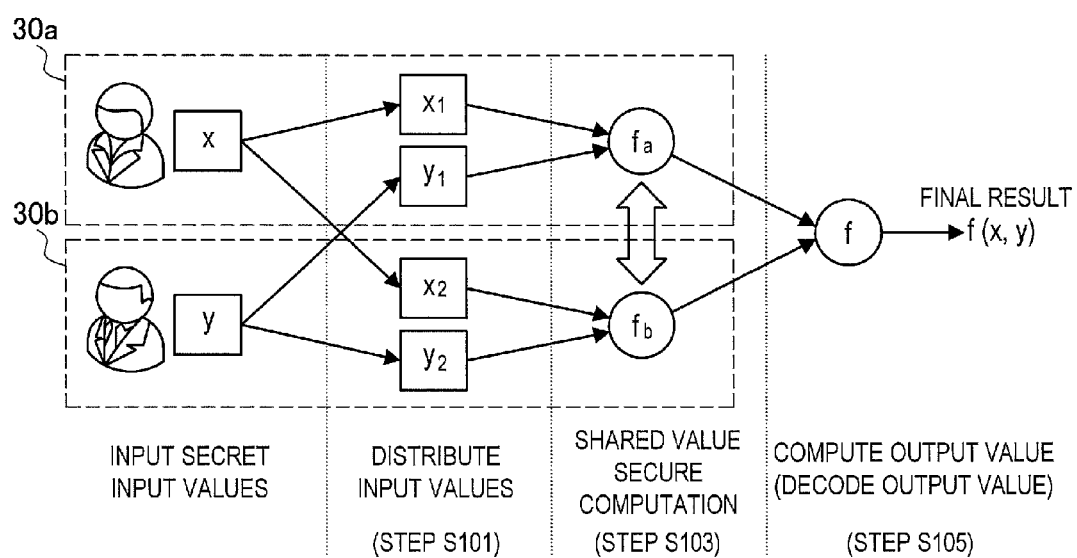
FIG. 2 shows a processing procedure of a secure computation protocol according to an embodiment.
Figure 3:
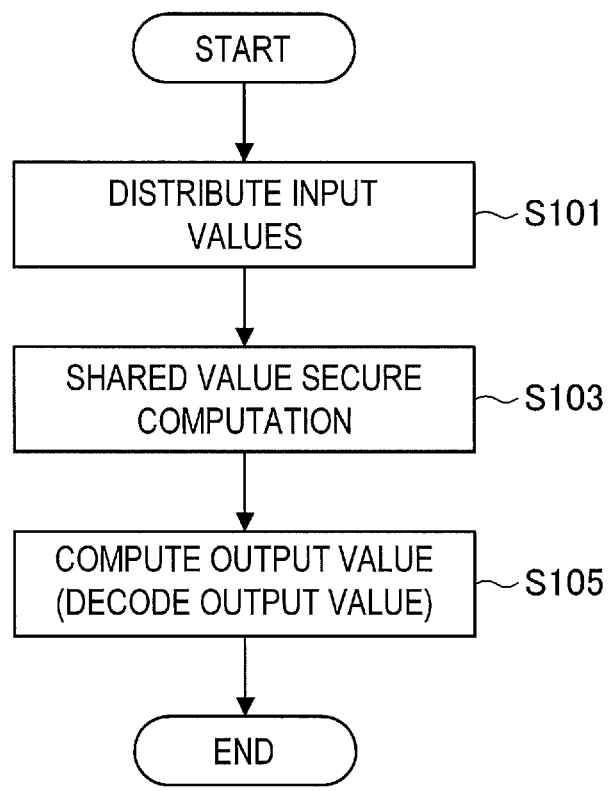
FIG. 3 is a flow chart showing a processing procedure of a secure computation protocol according to an embodiment.

Steps of processing in the secure computation protocol according to the present embodiment will be described more specifically with reference to FIG. 2 and FIG. 3. FIG. 2 shows a processing procedure of the secure computation protocol according to the present embodiment. FIG. 3 is a flow chart showing the processing procedure of the secure computation protocol according to the present embodiment.

A computation scheme called secret sharing scheme may be favorably applied to the secure computation protocol according to the present embodiment. The example shown in FIG. 2 and FIG. 3 shows a processing procedure in a secure computation protocol using the secret sharing scheme in a case in which two computation parties 30a and 30b obtain a function f(x,y) as an output value from two input values (x,y). Note that the number of computation parties and the number of input values in the secure computation protocol according to the present embodiment are not limited to those in this example, and more computation parties may execute computation based on a different number of input values.

First, as pre-processing of the execution of the secure computation protocol, an input value x and an input value y are respectively inputted to the computation party 30a and the computation party 30b. The input values x and y are kept confidential from each other of the computation parties 30a and 30b through the entire processing of the secure computation protocol. When the input values x and y are inputted to the computation parties 30a and 30b, in the secure computation protocol, first, the input values x and y are distributed to the computation parties 30a and 30b (step S101). Each of the values distributed to the computation parties 30a and 30b is called shared value. For example, as shown in FIG. 2, shared values $x_1$ and $x_2$ are generated from the input value x to be distributed to each of the computation parties 30a and 30b. In a similar manner, shared values $y_1$ and $y_2$ are generated from the input value y to be distributed to each of the computation parties 30a and 30b. Note that, hereinafter, a protocol that generates the shared values by distributing the input values is also called input value distribution protocol. The input value distribution protocol and a later-described output value decoding protocol will be described later in detail by taking the method described in Non-Patent Document 1 as an example in (2. Common secure computation protocol). Note that, in the present embodiment, after the execution of the input value distribution protocol, a later-described re-distribution protocol may be executed. By executing the re-distribution protocol after the execution of the input value distribution protocol, it becomes possible to further secure uniform distribution of the shared values.

Next, secure computation is executed on the shared values $x_1$, $x_2$, $y_1$, and $y_2$ (step S103). Here, the secure computation of the shared values means the execution of a computation protocol corresponding to a certain computation expression (hereinafter also referred to as computation expression protocol) using the shared values as input values. The certain computation expression is the function f (x, y) indicating an output value that is to be eventually obtained from the input values x and y as the input values in the secure computation protocol. Hereinafter, a simple description of "computation expression" may indicate a computation expression to be used in the secure computation protocol, the expression corresponding to the function f (x, y), unless otherwise specified. The execution of the computation expression protocol results in $f_a$ (x, y) computed in the computation party 30a and $f_b$ (x, y) computed in the computation party 30b. Here, $f_a$ (x, y) and $f_b$ (x, y) correspond to the shared values off (x, y).

Lastly, the output value f (x, y) is computed from $f_a$ (x, y) and $f_b$ (x, y) (step S105). In the step S105, f (x, y) is decoded from $f_a$ (x, y) and $f_b$ (x, y) which are the shared values, and thereby the final output value f (x, y) is computed. The processing shown in the step S105 may be performed in either or both of the computation parties 30a and 30b or may be performed in another party that has obtained $f_a$ (x, y) and $f_b$ (x, y) from the computation parties 30a and 30b. Note that, hereinafter, a protocol that obtains the output value by combining the shared values is also referred to as output value decoding protocol.

An example of the processing procedure of the secure computation protocol according to the present embodiment has been described above with reference to FIG. 2 and FIG. 3. As described above, the secure computation protocol according to the present embodiment may be configured from the combination of the input value distribution protocol which distributes input values and the output value decoding protocol which decodes the computation expression protocol corresponding to the computation expression and the output value. In the input value distribution protocol, by the secret input values being shared with the plurality of computation parties 30a and 30b, in each of the computation parties 30a and 30b, the computation expression protocol is executed by using the shared values as the input values. Accordingly, computation is executed without disclosing the secret input values to each other of the computation parties 30a and 30b. Hence, in the present embodiment, it becomes possible to execute desired computation by using the secret input values as the input values in a state in which the confidentiality of the secret input values is secured.

(1-3. System Configuration)

Figure 4:
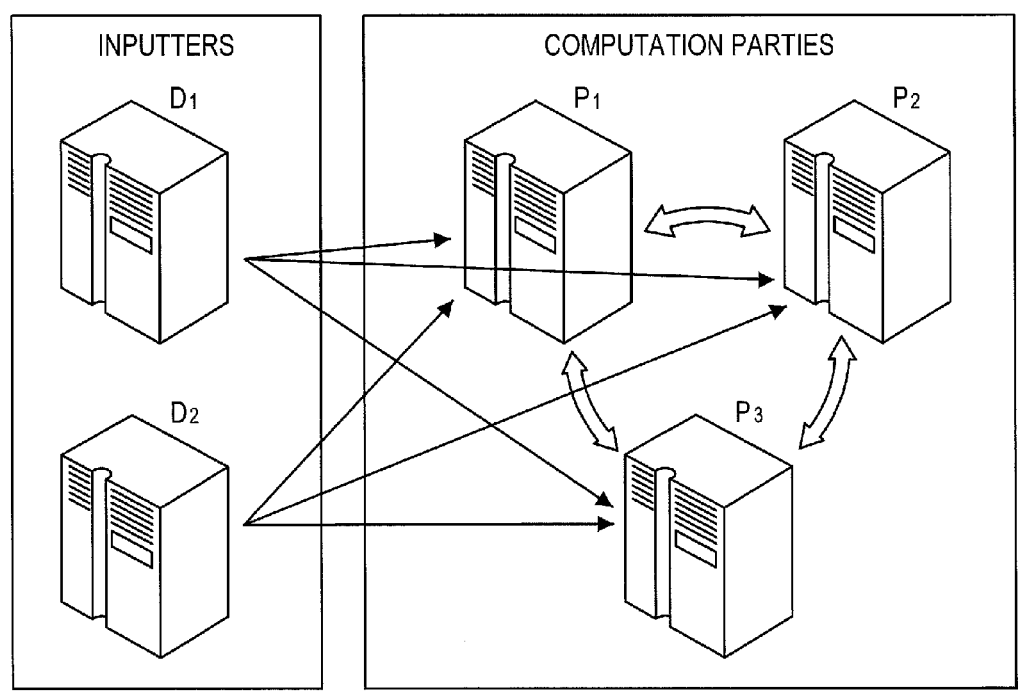
FIG. 4 shows a configuration example of a secure computation system in which a secure computation protocol according to an embodiment is executed.
Figure 5:
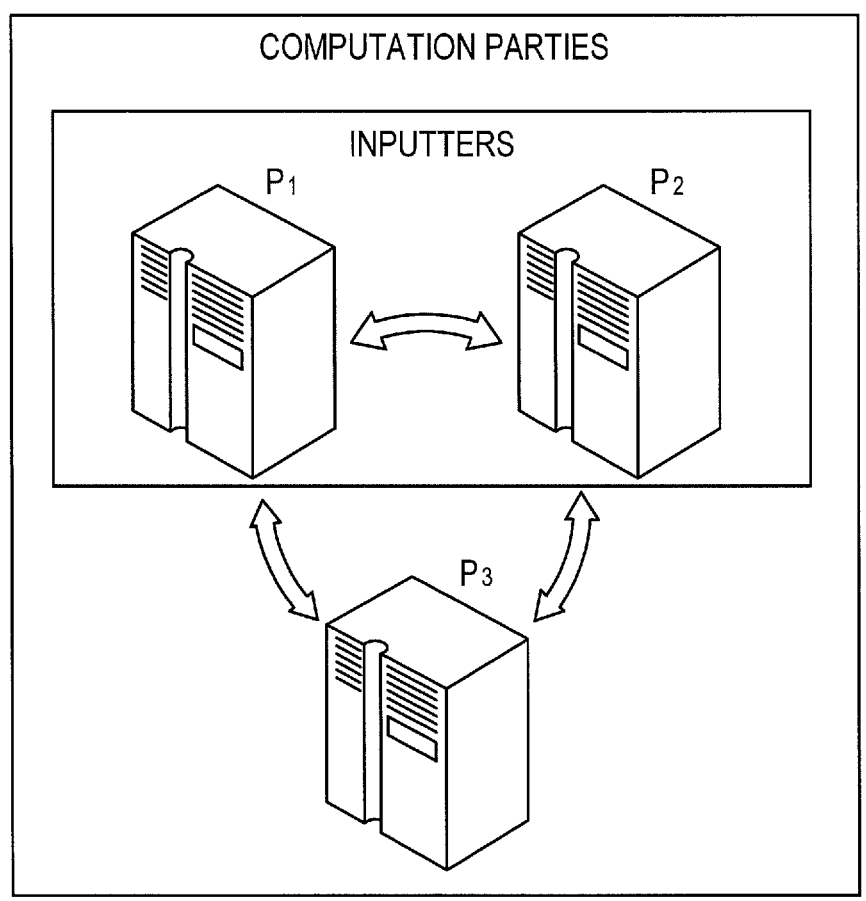
FIG. 5 shows another configuration example of a secure computation system in which a secure computation protocol according to an embodiment is executed.

Next, a configuration of a secure computation system in which the secure computation protocol according to the present embodiment is executed will be described with reference to FIG. 4 and FIG. 5. FIG. 4 shows a configuration example of a secure computation system in which the secure computation protocol according to the present embodiment is executed. FIG. 5 shows another configuration example of a secure computation system in which the secure computation protocol according to the present embodiment is executed.

In the secure computation system according to the present embodiment, there exist a party (inputter) that owns a secret input value and a party (computation party) that executes the secure computation protocol on the basis of the secret input values. The configuration example of the secure computation system shown in FIG. 4 show a case in which the inputter and the computation party are different from each other. Referring to FIG. 4, a secure computation system 1 may be configured from two inputters $D_1$ and $D_2$ and three computation parties $P_1$, $P_2$, and $P_3$.

The inputters $D_1$ and $D_2$ each own a secret input value that is kept confidential from each other. The inputters $D_1$ and $D_2$ share and distribute the secret input values to the computation parties $P_1$, $P_2$, and $P_3$. In this manner, in the secure computation system 1, the above processing in the step S101 shown in FIG. 2 and FIG. 3 may be executed by the inputters $D_1$ and $D_2$ instead of the computation parties $P_1$, $P_2$, and $P_3$.

The computation parties $P_1$, $P_2$, and $P_3$ execute computation on the basis of the computation expression protocol by using the shared values as the input values to hold the shared values related to the output value (corresponding to the processing in the step S103 shown in FIG. 2 and FIG. 3). Then, eventually, the shared values of the output value owned by the computation parties $P_1$, $P_2$, and $P_3$ are gathered together and the output value is decoded (corresponding to the processing in the step S105 shown in FIG. 2 and FIG. 3).

In contrast, the configuration example of the secure computation system shown in FIG. 5 shows a case in which the inputter also serves as the computation part. Referring to FIG. 5, a secure computation system 2 may be configured by three computation parties $P_1$, $P_2$, and $P_3$. Note that two computation parties $P_1$ and $P_2$ among the computation parties $P_1$, $P_2$, and $P_3$ also serve as the inputters and each owns a secret input value that is kept confidential from each other. Although the example in FIG. 5 shows a case in which two computation parties $P_1$ and $P_2$ among the three computation parties $P_1$, $P_2$, and $P_3$ serve as the inputters, the present embodiment is not limited to this example. One or all of the computation parties $P_1$, $P_2$, and $P_3$ may serve as the inputter(s).

The computation parties $P_1$ and $P_2$ as the inputters share and distribute the secret input values to the computation parties $P_1$, $P_2$, and $P_3$. That is, in the secure computation system 2, the above described processing in the step S101 shown in FIG. 2 and FIG. 3 may be executed by the computation parties $P_1$ and $P_2$ serving as the inputters.

The following processing is the same as that in the secure computation system 1 shown in FIG. 4. The computation parties $P_1$, $P_2$, and $P_3$ execute operations on the basis of the computation expression protocol by using the shared values as the input values, and the shared values related to the output value are obtained (corresponding to the step S103 shown in FIG. 2 and FIG. 3). Then, eventually, the shared values of the output value owned by the computation parties $P_1$, $P_2$, and $P_3$ are gathered together and the output value is decoded (corresponding to the processing in the step S105 shown in FIG. 2 and FIG. 3). Note that in both of the secure computation systems 1 and 2, the party that decodes the output value (output value obtainer) is not limited to a particular party, and any of the computation parties $P_1$, $P_2$, and $P_3$ may decode the output value or another party that is not shown in FIG. 4 (another information processing terminal) may decode the output value.

The configuration of the secure computation system according to the present embodiment has been described above with reference to FIG. 4 and FIG. 5. In the above manner, in the present embodiment, the inputter, and computation party, and the output value obtainer may the same party or mutually different parties. The configuration of the secure computation system may be set as appropriate depending on the situation where the secure computation protocol may be applied. Note that the configurations of the secure computation system shown in FIG. 4 and FIG. 5 are just examples, and the number of the inputters, the computation parties, and the output value obtainers that form the secure computation system may be set arbitrarily.

2. Common Secure Computation Protocol

The present inventors have studied common secure computation protocols. The common secure computation protocol will be described below by taking an example of the method described in the above Non-Patent Document 1.

(2-1. Details of Common Secure Computation Protocol)

In the method described in Non-Patent Document 1, processing that is substantially the same as the processing shown in FIG. 2 and FIG. 3 may be executed. In the method described in Non-Patent Document 1, first, a secret input value owned by an inputter is distributed to a plurality of computation parties (corresponding to the step S103 shown in FIG. 2 and FIG. 3). For example, according to the method described in Non-Patent Document 1, the inputter generates shared values $u_1$, $u_2$, and $u_3$ of an input value u in a manner that $u=u_1+u_2+u_3 \pmod{Z_{2^n}}$, the same holds true in the following operations) is satisfied, and distributes the shared values $u_1$, $u_2$, and $u_3$ to the computation parties. Hereinafter, the state in which the secret input value u is distributed to the computation parties is expressed as $<u>=(u_1, u_2, u_3)$. This processing is the above described processing corresponding to the input value distribution protocol, and an input value distribution protocol with respect to the input value u, for example, is also expressed as "$<u> \leftarrow \text{Share}(u)$" below. Note that specific processing performed in the input value distribution protocol will be shown later in (7. Protocols). Further, "random value $r \leftarrow Z_n$" shown in the input value distribution protocol in (7. Protocols) later means obtaining of one element from a ring of integers $Z_n$ at random and substituting the one element for a variable r.

Next, in the computation parties, a computation expression protocol corresponding to the computation expression that is used for computation in the secure computation protocol is executed by using the shared values as input values (corresponding to the step S103 shown in FIG. 2 and FIG. 3). Here, in the method described in Non-Patent Document 1, the computation expression protocol is expressed by the combination of basic operation protocols, which are protocols corresponding to basic operation processing (basic unit of operation). In the basic operation protocol, addition or multiplication is executed on the ring of integers by using the shared values as input values. By preparing basic operation protocols corresponding to addition and multiplication on the ring of integers, it becomes possible to combine these basic operation protocols to express a given arithmetic operation and logic operation.

For example, let us consider a case of computing "(u+v)×s" regarding three secret input values u, v, and s. In this case, a computation expression protocol corresponding to the computation expression "(u+v)×s" may be expressed by the combination of an addition protocol of adding the input values u and v on the ring of integers and a multiplication protocol of multiplying "u+v" obtained as an output of the addition protocol by the other input value s on the ring of integers.

In the addition protocol and the multiplication protocol, computation is executed by using $<u>$, $<v>$, and $<s>$ which are the shared values as input values. First, by the addition protocol, $<u+v>$ is obtained as the output value from the input values $<u>$ and $<v>$, and then, the multiplication protocol is executed by using $<u+v>$ and $<s>$ as input values to obtain $<(u+v)\times s>$ as the output value.

Note that, for example, in the following description, "$<w> \leftarrow \text{Add}(<u>, <v>)$" also means the addition protocol by which, from the shared values $<u>$ and $<v>$ which correspond to the input values u and v, a shared value $<w>$ of w in u+v=w is obtained. Further, for example, in the following description, "$<w'> \leftarrow \text{Mult}(<u>, <v>)$" also means the multiplication protocol by which, from the shared values $<u>$ and $<v>$ which correspond to the input values u and v, a shared value $<w'>$ of w' in u×v=w' is obtained. Specific processing executed in the addition protocol and the multiplication protocol will be shown later in (7. Protocols). Note that "$<u'> \leftarrow \text{Reshare}(<u>)$" shown later in the multiplication protocol in (7. Protocols) represents a protocol called re-distribution protocol. In the re-distribution protocol, for example, the shared value $<u>$ of the input value u is transformed into another shared value $<w>$ (w=u) while keeping the value. That is, in the re-distribution protocol, the input value is re-distributed to the computation parties without any change. Specific processing executed in the re-distribution protocol will also be shown later in (7. Protocols).

When $<(u+v)\times s>$ is obtained, then the output value obtainer decodes the output value (corresponding to the step S105 shown in FIG. 2 and FIG. 3). By decoding of $<(u+v)\times s>$, "(u+v)×s" as the output value is obtained. This processing is the above described processing corresponding to the output value decoding protocol, and the output value decoding protocol with respect to the input value w is also expressed as "$w \leftarrow \text{Decode}(w)$" below. Note that specific processing executed in the output value decoding protocol will be shown later in (7. Protocols).

(2-2. Study on Common Secure Computation Protocol)

Here, the execution time of the secure computation protocol includes, in addition to a local operation time in each computation party, a stand-by time and data-transmitting time in the communication among the computation parties. In particular, it is known that the stand-by time in communication has a much influence on the total execution time of the secure computation protocol. Accordingly, in order to further shorten the execution time of the secure computation protocol, a more reduction is demanded for the communication traffic among the computation parties.

On the other hand, as shown in (7. Protocols) later, in the multiplication protocol in the method described in Non-Patent Document 1, the computation parties communicate with each other. Specifically, in a series of processing steps included in the multiplication protocol shown in (7. Protocols) later, in processing shown in steps 1, 2, and 9 in which the re-distribution protocol is executed and in steps 3 to 5 in which the shared values are transmitted and received, the parties communicate with each other. Accordingly, in a case in which computation including a large number of multiplication protocols is executed in a common secure computation protocol, the communication traffic is increased among the computation parties, and the execution time of the secure computation protocol may be increased.

Here, let us consider a computation expression protocol in which two multiplication protocols are executed successively (computation expression protocol corresponding to a computation expression "(a×b)×c", for example). In this case, when the computation expression protocol is executed, immediately after the execution of processing in the step 9 (re-distribution protocol with respect to <a×b>, for example) in the first multiplication protocol, processing in the step 1 or the step 2 in the second multiplication protocol (re-distribution protocol with respect to <a×b> and re-distribution protocol with respect to <c>, for example) is executed. That is, the same processing (re-distribution protocol with respect to <a×b>, for example) may be executed twice in a successive manner. In this manner, specific processing procedures are not optimized in common secure computation protocols, and may prolong the execution time of the secure computation protocol.

On the basis of the above study on the common secure computation protocol, the present inventors have intensely studied a technique of shortening the execution time of the secure computation protocol. Accordingly, the present inventors have reached the following preferable embodiment of the present disclosure. In the following, the preferable embodiment of the present disclosure that the present inventors have reached will be described in detail. Note that the embodiment described below will be described by taking an example of a secure computation protocol that corresponds to the same conditions (for example, the number of the computation parties is three and each protocol shown in (7. Protocols) later may be used) as the technique described in Non-Patent Document 1 for comparison therebetween. However, the present embodiment is not limited to this example, and may be applied similarly to a secure computation protocol that corresponds to other conditions, for example, in which the number of the computation parties is different.

3. Configuration of Information Processing Apparatus

As described above, in the common secure computation protocol, the same shared value may be subjected to the execution of the re-distribution protocol successively. Here, the re-distribution protocol is a protocol that is executed in order to secure the confidentiality of the input value and the safety of the secure computation protocol (i.e., input value-confidentiality securing protocol). For example, in the multiplication protocol in the common secure computation protocol shown in (7. Protocols) later, the processing in the steps 1 and 2 is performed in order to randomize the shared input values, and the processing in the step 9 is performed in order to distribute shared values of the output value uniformly among the computation parties, independently of the shared values of the input values. Accordingly, considering the reason of the execution of the re-distribution protocol, even when the number of times of the re-distribution protocol executed successively on the same shared value (that is, the function is the same), it is considered that the confidentiality of the input values is sufficiently secured and that the safety of the secure computation protocol is maintained.

Accordingly, in the present embodiment, by optimizing the configuration of the secure computation protocol, the total execution time thereof is to be shortened. Specifically, by reducing the above described protocol having the same function from the secure computation protocol, a more efficient secure computation protocol is derived (generated). Hereinafter, the more efficient secure computation protocol obtained in the present embodiment is also referred to as improved secure computation protocol conveniently to be differentiated from the common secure computation protocol.

More specifically, in the present embodiment, by using the computation expression in the secure computation protocol as the input, the re-distribution protocol having the same function is removed from the computation expression protocol corresponding to the computation expression, and a computation expression protocol in which the re-distribution protocol is appropriately re-arranged (hereinafter also referred to as improved computation expression protocol conveniently in order to be differentiated from a common computation expression protocol) is generated. The configuration of an information processing apparatus having the function of generating such an improved computation expression protocol will be described in detail below.

Note that the above improved secure computation protocol corresponds to the combination of the input value distribution protocol, the improved computation expression protocol, and the output value decoding protocol. In contrast, the common secure computation protocol may be configured from the combination of the input value distribution protocol, the computation expression protocol, and the output value decoding protocol. In this manner, in the improved secure computation protocol according to the present embodiment, the computation expression protocol in the secure computation protocol may be replaced by the improved computation expression protocol. Accordingly, the generation of the improved secure computation protocol may mean the generation of the improved computation expression protocol, and the information processing apparatus according to the present embodiment has a function of generating the improved secure computation protocol or the improved computation expression protocol in a sense.

Figure 6:
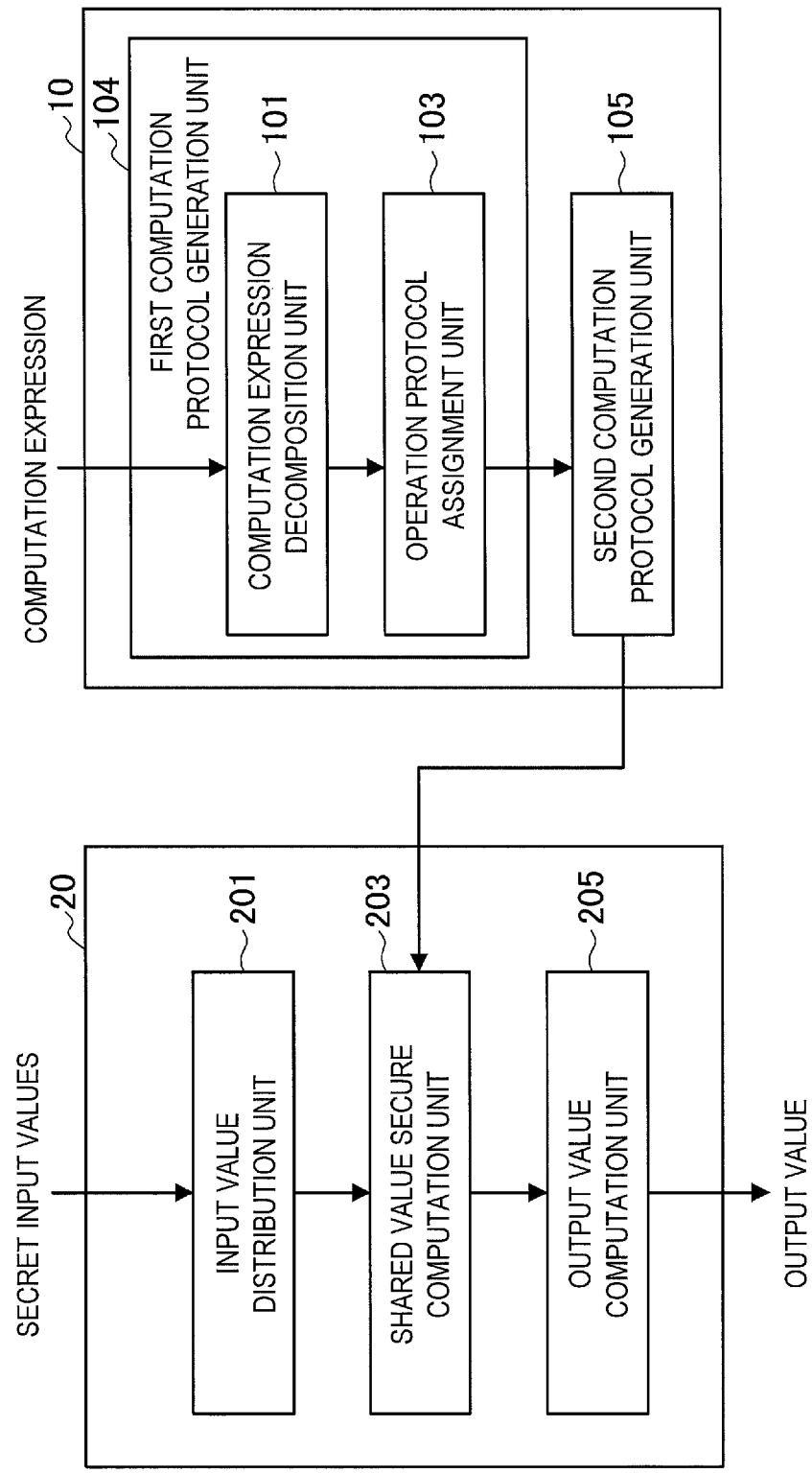
FIG. 6 is a functional block diagram showing a functional configuration of an information processing apparatus according to an embodiment.

A functional configuration of the information processing apparatus according to the present embodiment will be described with reference to FIG. 6. FIG. 6 is a functional block diagram showing the functional configuration of the information processing apparatus according to the present embodiment.

Note that the improved secure computation protocol or the improved computation expression protocol may be generated in any of the computation parties that execute the improved secure computation protocol, or may be generated in another information processing apparatus to be inputted to each computation party. In FIG. 6, as an example, a case will be described in which the improved computation expression protocol is generated in another information processing apparatus that is different from the computation parties. Further, in FIG. 6, a functional configuration corresponding to the computation parties (later-described operation processing apparatus 20) is also shown for explanation.

Referring to FIG. 6, an information processing apparatus 10 according to the present embodiment includes a first computation protocol generation unit 104 and a second computation protocol generation unit 105. Note that each function included in the information processing apparatus 10 may be achieved by the operation of various processors in accordance with a certain program, such as a CPU (central processing unit) and a DSP (digital signal processor) built in in the information processing apparatus 10.

The first computation protocol generation unit 104 generates a first computation protocol that does not include a re-distribution protocol on the basis of the secure computation protocol. Specifically, the first computation protocol generation unit 104 has a function of removing the re-distribution protocol from the computation expression protocol corresponding to the computation expression in the secure computation protocol. That is, the first computation protocol may mean a protocol obtained by removing the re-distribution protocol from the computation expression protocol.

The function of the first computation protocol generation unit 104 will be described more specifically. The first computation protocol generation unit 104 includes, as the function thereof, a computation expression decomposition unit 101 and an operation protocol assignment unit 103.

The computation expression decomposition unit 101 decomposes the computation expression in the secure computation protocol into certain operation processing. For example, the computation expression decomposition unit 101 can decompose the computation expression into operation processing corresponding to the above described basic operation protocols (addition protocol and multiplication protocol). The computation expression decomposition unit 101 provides information on the decomposed computation expression to the operation protocol assignment unit 103.

The operation protocol assignment unit 103 assigns a protocol expressing the certain operation processing to the decomposed computation expression. Here, as the protocol assigned by the operation protocol assignment unit 103, a protocol that expresses the certain operation processing and does not include the re-distribution protocol is selected. For example, in the technique described in Non-Patent Document 1 described in the above (2. Common secure computation protocol), in the addition protocol and the multiplication protocol as the basic operation protocols, the multiplication protocol includes the re-distribution processing (refer to (7. Protocols) described later). In the present embodiment, instead of the multiplication protocol, a multiplication protocol that does not include the re-distribution protocol (hereinafter also referred to as shared value multiplication protocol) is used. Note that the shared value multiplication protocol is a multiplication protocol in which the shared value $<w>$ of w in u×v=w is obtained from the shared values $<u>$ and $<v>$ corresponding to the input values u and v, for example. Hereinafter, the shared value multiplication protocol is also expressed as "$<w> \leftarrow Mult2(<u>, <v>)$". Specific processing performed in the shared value multiplication protocol will be described in (7. Protocols) later.

For example, let us assume that the computation expression is decomposed by the computation expression decomposition unit 101 into addition and multiplication which are basic operation processing corresponding to the basic operation protocol. The operation protocol assignment unit 103 assigns the addition protocol to a portion corresponding to the addition in the decomposed computation expression, and assigns the shared value multiplication protocol to a portion corresponding to the multiplication in the decomposed computation expression. Accordingly, a protocol generated by the operation protocol assignment unit 103 (that is, first computation protocol) is the protocol obtained by removing the re-distribution protocol from the computation expression protocol (that is, the computation expression protocol that does not include the re-distribution protocol). The operation protocol assignment unit 103 provides information on the generated first computation protocol to the second computation protocol generation unit 105.

The second computation protocol generation unit 105 generates a second computation protocol by re-arranging the re-distribution protocol to an appropriate position at which the confidentiality of the input values can be secured in the generated first computation protocol. As described above, the re-distribution protocol is a protocol executed in order to secure the confidentiality of the input values and to secure the safety of the secure computation protocol. Accordingly, considering the confidentiality of the input values, the appropriate position at which the re-distribution protocol is to be arranged may be a position after processing with communication among the computation parties. Accordingly, by arranging the re-distribution protocol to a position at least after any one of steps of processing with communication among the computation parties, the second computation protocol generation unit 105 can generate the second computation protocol from which the same re-distribution protocol is removed (that is, the improved computation expression protocol). Note that, specifically, in a case in which the shared values are transmitted and received among the computation parties, the shared values as the input values of the secure computation protocol and the shared values as the output value are no longer independent of one another, and the safety of the secure computation protocol might decrease. Accordingly, the second computation protocol generation unit 105 may arrange the re-distribution protocol to a position at least after any one of steps of processing with communication of the shared values among the computation parties.

Here, even in a case in which the communication of the shared values is performed among the computation parties, at a stage in which each of the computation parties holds the shared values locally as computation results of the shared values, the security is not inhibited. However, after that, when the shared value is transmitted to another computation party, the security might be inhibited. Accordingly, in the present embodiment, in a case in which, after first processing with the communication among the computation parties, second processing with the communication among the computation parties is performed again, the second computation protocol generation unit 105 may arrange the re-distribution protocol between the first processing and the second processing.

The second computation protocol generation unit 105 transmits the generated improved computation expression protocol to the operation processing apparatus 20 (that is, the computation parties $P_1$, $P_2$, and $P_3$). Further, in the operation processing apparatus 20, the improved secure computation protocol based on the improved computation expression protocol is executed.

The functional configuration of the information processing apparatus 10 has been described above. Note that the above described processing performed by the computation expression decomposition unit 101, the operation protocol assignment unit 103, and the second computation protocol generation unit 105 correspond to processing shown in FIG. 7, which will be described later in (4. Processing procedure of information processing method). Accordingly, the processing performed by the computation expression decomposition unit 101, the operation protocol assignment unit 103, and the second computation protocol generation unit 105 will be described in detail later in (4. Processing procedure of information processing method).

As described above, according to the present embodiment, in order to remove the re-distribution protocol that has the same function from the computation expression protocol, the shared value multiplication protocol obtained by removing the re-distribution protocol from the multiplication protocol is used. By decomposing the computation expression and assigning the shared value multiplication protocol to a portion corresponding to the multiplication, the first computation protocol which is the computation expression protocol that does not include the re-distribution protocol is generated. After that, by arranging the re-distribution protocol to an appropriate position in order to secure the confidentiality of the input values, the re-distribution protocol having the same function is removed, and in addition, the second computation protocol by which the confidentiality of the input values is also secured can be generated.

Here, the case in which, by use of the computation expression (that is, the computation expression protocol) as the input, the information processing apparatus 10 generates the improved computation expression protocol obtained by removing the same re-distribution protocol from the computation expression protocol has been described above; however, the present embodiment is not limited to this example. In the present embodiment, the information processing apparatus 10 may generate the improved secure computation protocol by removing the same re-distribution protocol from the secure computation protocol by use of the entire secure computation protocol as the input.

As described above, the improved secure computation protocol corresponds to the secure computation protocol in which the computation expression protocol is replaced by the improved computation expression protocol (that is, the input value distribution protocol and the output value decoding protocol are not changed). Accordingly, even in a case in which the secure computation protocol is given as the input, since the above described steps of processing are executed on the computation expression protocol included in the secure computation protocol, the improved secure computation protocol can be generated. In the above description, the first computation protocol may mean "a protocol obtained by removing the re-distribution protocol from the computation expression protocol" or "a protocol obtained by removing the re-distribution protocol from the computation expression protocol in the secure computation protocol". In a similar manner, the second computation protocol may mean the "improved computation expression protocol" or the "improved secure computation protocol".

In addition, the above description has shown the case in which the computation expression decomposition unit 101 decomposes the computation expression to basic operation processing and the operation protocol assignment unit 103 assigns the basic operation protocol to the decomposed computation expression; however, the present embodiment is not limited to this example. For example, the computation expression decomposition unit 101 may decompose the computation expression to certain operation processing formed by the combination of a plurality of steps of the basic operation processing. That is, in the present embodiment, the standard applied when the computation expression decomposition unit 101 decomposes the computation expression may be basic operation processing, which is the operation of the minimum unit, or may be given operation processing formed by appropriate computation of steps of the basic operation processing. Further, in a case in which the computation expression decomposition unit 101 decomposes the computation expression to certain operation processing formed by the combination of a plurality of steps of the basic operation processing, the operation protocol assignment unit 103 may assign, to the decomposed computation expression, an operation protocol formed by the combination of a plurality of the basic operation protocols corresponding to the operation processing used as the standard when the computation expression decomposition unit 101 decomposes the computation expression. In this case, the operation protocol assigned by the operation protocol assignment unit 103 may be a protocol obtained by removing the re-distribution protocol from the protocol corresponding to the certain operation processing used as the standard when the computation expression decomposition unit 101 decomposes the computation expression.

Next, a functional configuration of the operation processing apparatus 20 will be described. Referring to FIG. 6, the operation processing apparatus 20 according to the present embodiment includes an input value distribution unit 201, a shared value secure computation unit 203, and an output value computation unit 205. Note that each function included in the operation processing apparatus 20 may be achieved by the operation of various processors in accordance with a certain program, such as a CPU and a DSP built in the operation processing apparatus 20.

Here, the operation processing apparatus 20 corresponds to the computation parties $P_1$, $P_2$, and $P_3$ shown in FIG. 4 and FIG. 5. Actually, although a plurality of the operation processing apparatuses 20 for executing the secure computation protocol may exist, the operation processing apparatuses 20 may have the same function, so that one operation processing apparatus 20 is shown typically in FIG. 6 for simplicity. The example in FIG. 6 shows, as the operation processing apparatus 20, a functional configuration of the computation parties having the function as the inputter and the output value obtainer.

The input value distribution unit 201 generates the shared values on the basis of an inputted secret input value, and distributes the generated shared values to each operation processing apparatus 20 that forms the computation parties. The processing performed by the input value distribution unit 201 corresponds to the above described processing in the step S101 shown in FIG. 2 and FIG. 3. By executing the input value distribution protocol, the input value distribution unit 201 can distribute the shared values of the inputted secret input value to each operation processing apparatus 20. Note that as in the secure computation system 1 shown in FIG. 4, in a case in which the inputters $D_1$ and $D_2$ and the computation parties $P_1$, $P_2$, and $P_3$ are separate, the computation parties $P_1$, $P_2$, and $P_3$ (that is, the operation processing apparatus 20) may not have the function of the input value distribution unit 201, and a party corresponding to the inputters $D_1$ and $D_2$ (such as an information processing terminal) may execute the function of the input value distribution unit 201 and a party corresponding to the inputters $D_1$ and $D_2$ may transmit the shared values to the operation processing apparatus 20.

On the basis of the improved computation expression protocol generated by the information processing apparatus 10, the shared value secure computation unit 203 executes secure computation on the distributed shared value. Specifically, the shared value secure computation unit 203 executes the improved computation expression protocol generated by the information processing apparatus 10 by using the shared values of the secret input value as the input. Note that the processing performed by the shared value secure computation unit 203 corresponds to the above described processing in the step S103 shown in FIG. 2 and FIG. 3.

The output value computation unit 205 computes the output value from the results of secure computation performed by the shared value secure computation unit 203 (that is, the shared values of the output value). By executing the output value decoding protocol on the results of secure computation performed by the shared value secure computation unit 203, the output value computation unit 205 can compute the output value. Note that the processing performed by the output value computation unit 205 corresponds to the above described processing in the step S105 shown in FIG. 2 and FIG. 3. Further, in a case in which the output value obtainer and the computation parties $P_1$, $P_2$, and $P_3$ are separate, the computation parties $P_1$, $P_2$, and $P_3$ (that is, the operation processing apparatus 20) may not have the function of the output value computation unit 205, and the results of secure computation performed by the shared value secure computation unit 203 are transmitted to a party corresponding to the output value obtainer (such as another information processing terminal), and the party corresponding to the output value obtainer may perform the function of the output value computation unit 205.

The functional configurations of the information processing apparatus 10 and the operation processing apparatus 20 according to the present embodiment have been described above with reference to FIG. 6. As described above, according to the present embodiment, the information processing apparatus 10 generates the improved computation expression protocol or the improved secure computation protocol from which the re-distribution protocol having the same function is removed. Further, the plurality of operation processing apparatuses 20 execute the secure computation protocol using the improved computation expression protocol or improved secure computation protocol. Here, since the re-distribution protocol is a protocol with communication among the operation processing apparatuses 20, the execution time tends to be longer than in other protocols in which communication is not performed. In the present embodiment, by the execution of the secure computation protocol using the computation expression protocol from which the re-distribution protocol having the same function is removed, that is, the computation expression protocol in which the re-distribution protocol is appropriately arranged, the execution time of the entire secure computation protocol can be shortened.

Note that the re-distribution protocol in the above description may be an example of the confidentiality securing protocol performed to maintain the confidentiality of the input values. In the secure computation protocol, in a case in which the shared values are not transmitted or received among the operation processing apparatuses 20, in order to maintain the confidentiality of the input values, the confidentiality securing protocol such as shown in the re-distribution protocol may be executed. In the present embodiment, for example, the secure computation protocol includes a part in which the confidentiality securing protocol is executed in an overlapping manner, and in a case in which the function is the same (that is, in a case in which the confidentiality of the input values can be secured even when the confidentiality securing protocol is executed once), the improved secure computation protocol from which a surplus confidentiality securing protocol is removed can be generated by a method similar to that described above.

The example in FIG. 6 shows a case in which the apparatus that generates the improved secure computation protocol (that is, the information processing apparatus 10) and the apparatus that executes the improved secure computation protocol (that is, the operation processing apparatus 20) are separate apparatuses; however, the present embodiment is not limited to this example. The operation processing apparatus 20 (that is, the computation parties) may generate the improved secure computation protocol. In this case, the operation processing apparatus 20 further includes each function included in the information processing apparatus 10 shown in FIG. 6. Further, the functions (the computation expression decomposition unit 101, the operation protocol assignment unit 103, and the second computation protocol generation unit 105) included in the information processing apparatus 10 may not be performed by one apparatus, and may be performed by cooperation of a plurality of apparatuses. Furthermore, the information processing apparatus 10 may be a server or a server group installed on a network (on a so-called cloud) and functions included in the information processing apparatus 10 may be performed by the server or the server group installed on a network.

Note that it is possible to create a computer program for performing the above described functions of the information processing apparatus 10 or the operation processing apparatus 20 according to the present embodiment, and to install the computer program to a personal computer, for example. It is also possible to provide a computer-readable recording medium having such a computer program recorded thereon. Examples of the recording medium include a magnetic disk, an optical disc, a magneto-optical disk, a flash memory, and the like. The computer program may be distributed via a network, for example, instead of using the recording medium.

4. Processing Procedure of Information Processing Method

(4-1. Outline of Information Processing Method)

Figure 7:
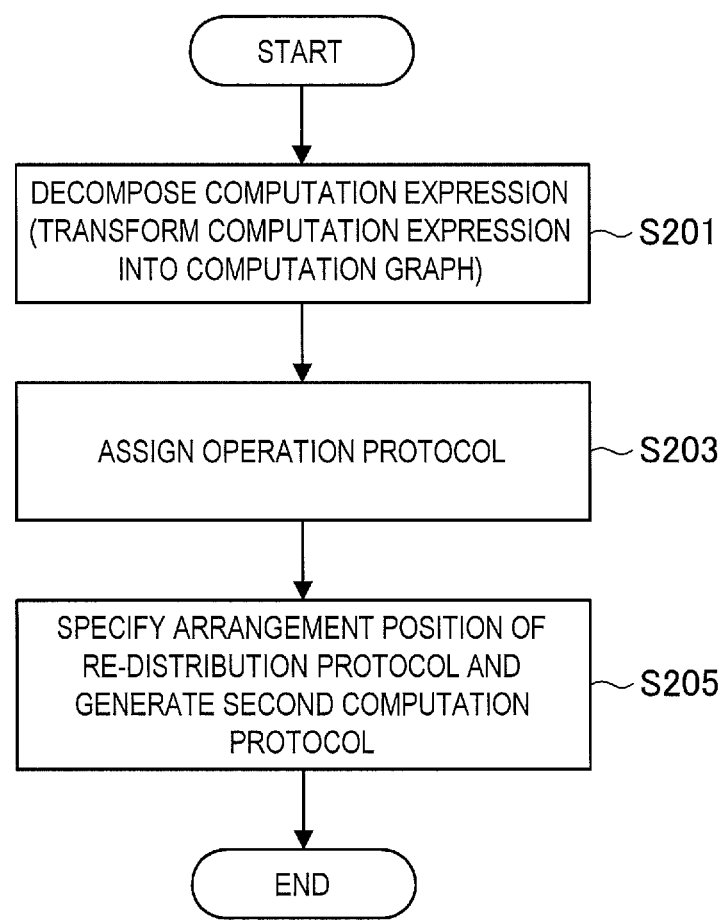
FIG. 7 is a flow chart showing an example of a processing procedure of an information processing method according to an embodiment.

Next, a processing procedure of an information processing method according to the present embodiment will be described with reference to FIG. 7. FIG. 7 is a flow chart showing an example of the processing procedure of the information processing method according to the present embodiment.

Referring to FIG. 7, in the information processing method according to the present embodiment, the computation expression of the secure computation protocol is decomposed to certain operation processing (step S201). For example, in the step S201, the computation expression of the secure computation protocol is decomposed to basic operation processing. Note that the processing shown in the step S201 corresponds to the processing performed by the computation expression decomposition unit 101 shown in FIG. 6 above.

Next, a protocol expressing certain operation processing is assigned to the decomposed computation expression (step S203). As the protocol assigned in the step S203, a protocol that does not include the re-distribution protocol is selected. For example, in a case in which the computation expression is decomposed to addition and multiplication, which are basic operation processing, in the step S201, in the step S203, the addition protocol is assigned to a portion corresponding to the addition in the decomposed computation expression, and the shared value multiplication protocol is assigned to a portion corresponding to the multiplication in the decomposed computation expression. Note that the processing shown in the step S203 corresponds to the above described processing performed by the operation protocol assignment unit 103 shown in FIG. 6 above, and in the step S203, the above-described first computation protocol is generated.

Next, in the first computation protocol generated in the step S203, the re-distribution protocol is re-arranged to an appropriate position at which the confidentiality of the input values can be secured, and thereby the second computation protocol is generated (step S205). Note that the processing shown in the step S205 corresponds to the processing performed by the second computation protocol generation unit 105 shown in FIG. 6 above, and the second computation protocol corresponds to the improved secure computation protocol or the improved computation expression protocol. On the basis of the second computation protocol generated in the step S205, computation is executed among the computation parties.

(4-2. Details of Information Processing Method)

Details of the steps of the processing in the above-described information processing method will be described sequentially. Note that the following description will be made by taking an example of a case in which the computation expression is decomposed to addition and multiplication, which are basic operation processing. Further, as a specific example, a case in which the computation expression is expressed as the following expression (1) will be described.

$$y = x_1 x_2 x_3 + x_4 x_5 \quad (1)$$

Here, $x_1$, $x_2$, $x_3$, $x_4$, and $x_5$ are secret input values and y is the output value. That is, the secure computation protocol according to this specific example is a protocol in which the three computation parties $P_1$, $P_2$, and $P_3$ compute the output value y expressed as the above expression (1) on the basis of the secret input values $x_1$, $x_2$, $x_3$, $x_4$, and $x_5$ in the state in which the secret input values $x_1$, $x_2$, $x_3$, $x_4$, and $x_5$ are kept confidential from one another of the parties.

(Step S201: Decomposition of Computation Expression)

In the processing shown in the step S201, the computation expression is decomposed to a computation procedure (hereinafter also referred to as computation process) configured from a binary operation of addition or a binary operation of multiplication. Then, by use of the decomposed computation expression, the computation expression is transformed into a computation graph that expresses the process in which the addition or the multiplication is performed sequentially. At this time, since all the operation corresponding to the computation expression is on the ring, subtraction is transformed into addition.

(S201-1)

First, the computation expression is subjected to processing in which the binary operation with respect to two input variables (variables corresponding to input values) is replaced by an intermediate variable. The intermediate variable is further subjected to processing in which the binary operation with respect to the input variable and the intermediate variable, or with respect to the intermediate variable and the intermediate variable, is replaced by another intermediate variable. This processing is repeated until the relation (output variable)=(input variable or intermediate variable) is satisfied.

For example, in the above expression (1), $v_1$ is assigned as the intermediate variable to $x_1 x_2$ ($v_1 = x_1 x_2$). In the same manner, the binary operation of variables included in the expression (1) is replaced by the intermediate variable.

(S201-2)

When the processing shown in the step S201-1 is finished, processing is performed in which expressions in which the intermediate variable and the output variable are in the left side, and the binary operation of variables is in the right side are listed. The order of listing the expressions is the order of replacing the binary operation by intermediate variables. For example, when the processing shown in the steps S201-1 and S201-2 is performed in the expression (1), the following expression (2) is obtained.

$$v_1 = x_1 x_2$$

$$v_2 = x_4 x_5$$

$$v_3 = v_1 x_3$$

$$v_4 = v_2 + v_3$$

$$y = v_4 \quad (2)$$

Here, $v_1$, $v_2$, $v_3$, and $v_4$ are intermediate variables. The expression (2) corresponds to expressions obtained by decomposing the above expression (1) to a computation process including a plurality of expressions.

(S201-3)

When the computation expression is decomposed to the computation process, the computation process is expressed by a computation graph. The computation graph includes vertexes corresponding to the input variables, the output variable, and the intermediate variables. A directional branch is provided from the vertex corresponding to the variable in the right side of the expression representing the computation process toward the vertex corresponding to the variable in the left side of the expression (that is, the starting point is the variable in the right side and the end point is the variable in the left side). Further, a binary operator is assigned to the vertex corresponding to the intermediate variable.

Figure 8:
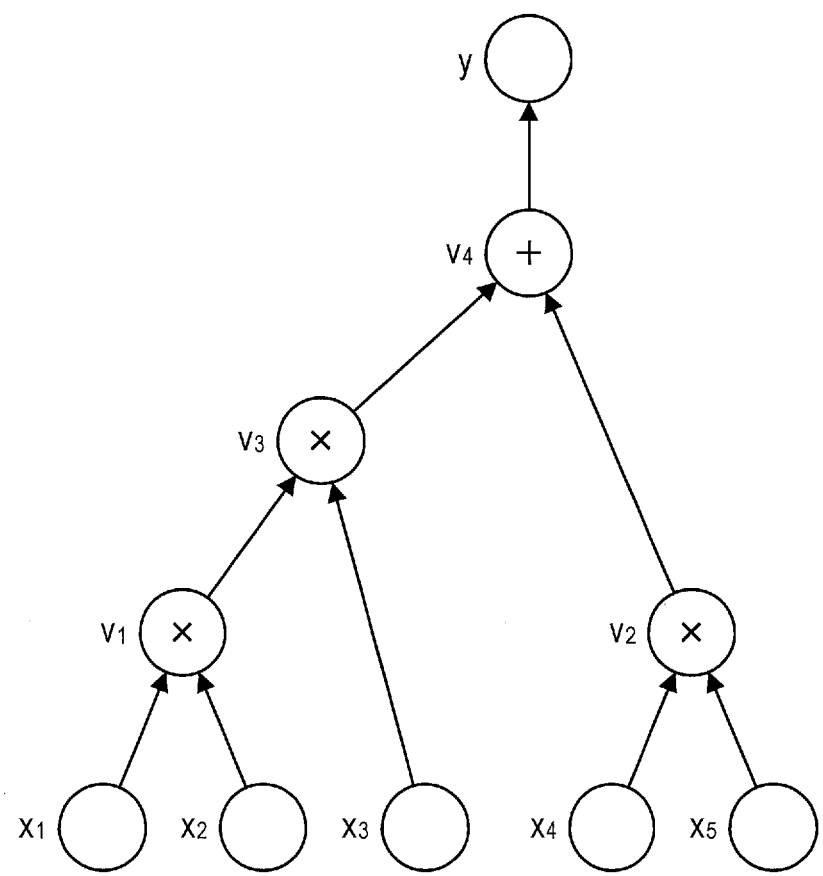
FIG. 8 shows an example of a computation graph created in processing of a step S201 shown in FIG. 7.

FIG. 8 shows an example of the computation graph. FIG. 8 shows an example of the computation graph created in the processing of the step S201 shown in FIG. 7. The computation graph shown in FIG. 8 corresponds to the computation process shown in the above expression (2). For example, as shown in FIG. 8, "$v_1 = x_1 x_2$" which is the first expression in the above expression (2) is expressed such that a directional branch is extended from a vertex expressing $x_1$ to a vertex expressing $v_1$ and a directional branch is extended from a vertex expressing $x_2$ to a vertex expressing $v_1$ in the computation graph. Further, to the vertex expressing the intermediate variable $v_1$, a symbol denoting multiplication is assigned.

(Step S203: Assignment of Operation Protocol)

In the processing shown in the step S203, the basic operation protocol is assigned to the computation expression, and the computation expression is transformed into the first computation protocol. Specifically, to the addition and multiplication in the computation process obtained in the step S201, the addition protocol and the shared value multiplication protocol which are basic operation protocols are assigned, respectively.

For example, since "$v_1=x_1x_2$" which is the first expression in the above expression (2) is multiplication, a shared value multiplication protocol $<v_1>\leftarrow \text{Mult2}(<x_1>,<x_2>)$ is assigned to this expression. Eventually, the expression (2) is transformed into the following expression (3). The following expression (3) expresses the above expression (2) as the computation protocol, and corresponds to the above described first computation protocol.

$$<v_1>\leftarrow \text{Mult2}(<x_1>,<x_2>)$$

$$<v_2>\leftarrow \text{Mult2}(<x_4>,<x_5>)$$

$$<v_3>\leftarrow \text{Mult2}(<v_1>,<x_3>)$$

$$<v_4>\leftarrow \text{Add}(<v_2>,<v_3>)$$

$$<y>\leftarrow <v_4> \quad (3)$$

Note that the fifth-line expression ($<y>\leftarrow<v_4>$) in the expression (3) corresponds to the processing of generating the shared values of y, which is the final output value, from the shared values of the intermediate variable v4.

(Step S205: Generation of Improved Computation Expression Protocol (Re-Arrangement of Re-Distribution Protocol))

In the processing shown in the step S205, in the first computation protocol generated in the step S203, the re-distribution protocol is re-arranged at an appropriate position, and thereby the improved computation expression protocol (second computation protocol) is generated. Specifically, the position where the re-distribution protocol is arranged is decided by using the computation graph in accordance with the following procedure.

(S205-1)

First, from among the vertexes corresponding to all the intermediate variables in the computation graph, vertexes at which the assigned operator is multiplication are extracted. A set of the extracted vertexes is shown as V. In the example shown in FIG. 8, the set of such intermediate variables is $V=\{v_1,v_2,v_3\}$.

(S205-2)

Then, all the vertexes v∈V are subjected to processing of the following steps S205-2-1 and S205-2-2.

(S205-2-1)

From the vertex $v=v_i$ as the starting point, all the vertexes (intermediate variables) traced by directional branches are extracted. Then, from among the extracted vertexes, vertexes that cannot be a starting point from which another intermediate variable is not traced are extracted, and a set thereof is shown as $V_i$. At this time, directional branches toward the vertex corresponding to the output variable is excluded from the target. In the example shown in FIG. 8, when $v=v_1$, the vertexes that can be traced from directional branches from $v_1$ as the starting point are $v_3$ and $v_4$. The vertex that does not serve as a starting point in the two is $v_4$, so that $V_1=\{v_4\}$ is set. In the step S205-2-1, with respect to the vertexes expressing multiplication, an end point of a path showing the order of operation performed in a later-stage of the multiplication is extracted.

(S205-2-2)

Next, as for all the extracted vertexes $v_j \in V_i$ corresponding to the starting point $v=v_i$, the following procedure is performed. That is, a set of all the vertexes existing on the path between the starting point and each vertex is shown as $V_{ij}$. In the example shown in FIG. 8, considering a path from the starting point $v=v_1$ to the vertex $v_4$, $V_{14}=\{v_1, v_3, v_4\}$ is set. Further, as for all the vertexes $w=v_k$ in $V_{ij}$, the following steps of processing are performed sequentially from the starting point to the end point until the following ending conditions are satisfied. That is, in a case in which the vertex of the end point of a directional branch from a vertex w as a starting point is a vertex that corresponds to the intermediate variable to which multiplication is assigned, or a vertex that corresponds to the output variable, the vertex w is extracted and included in a set of vertexes shown as $V_D$, and the processing ends. In a case in which the operator of the end point is addition, the same procedure is repeated by using the end point as the starting point w. In the example shown in FIG. 8, when $V_{14}=\{v_1, v_3, v_4\}$, $w=v_1$ is set first, and the end point of a directional branch using $v_1$ as the starting point is determined. Since the end point of the directional branch using $v_1$ as the starting point is $v_3$ and $v_3$ is multiplication, $v_1$ is included in $V_D$ and search in the set $V_{14}$ ends. In the step S205-2-2, in the path to the end point extracted in the step S205-2-1, a vertex v on which a vertex corresponding to multiplication or the output value in a later stage is extracted. In this manner, by performing the processing shown in the steps S205-2-1 and S205-2-2, in the computation graph, the portion in which multiplication is performed or the output value is outputted after multiplication is extracted.

When the processing in the steps S205-2-1 and S205-2-2 is performed for all the vertexes v∈V, in the example shown in FIG. 8, $v_1$ is extracted in a case of $v=v_1$, $v_4$ is extracted in a case of $v=v_2$, and $v_4$ is extracted in a case of $v=v_3$. Accordingly, $V_D=\{v_1, v_4\}$ is set.

(S205-3)

Next, immediately after the basic operation protocol corresponding to the operation of vertexes included in the set $V_D$, the vertexes being extracted in the step S205-2, the re-distribution protocol is arranged. In the example shown in FIG. 8, since $V_D=\{v_1, v_4\}$, after the first and fourth protocols in the above expression (3), the re-distribution protocols are arranged. The eventually obtained improved computation expression protocol after the re-distribution protocols are arranged is a protocol shown in the following expression (4).

$$<v_1>\leftarrow \text{Re share}(\text{Mult2}(<x_1>,<x_2>))$$

$$<v_2>\leftarrow \text{Mult2}(<x_4>,<x_5>)$$

$$<v_3>\leftarrow \text{Mult2}(<v_1>,<x_3>)$$

$$<v_4>\leftarrow \text{Re share}(\text{Add}(<v_2>,<v_3>))$$

$$<y>\leftarrow <v_4> \quad (4)$$

The processing procedure of the information processing method according to the present embodiment has been described above. Here, the improved secure computation protocol obtained by the above described information processing method according to the present embodiment and the secure computation protocol used in a common method are compared with each other.

For example, the computation expression of the above expression (1) is expressed as the following expression (5)

when being expressed in the computation expression protocol by using the method described in Non-Patent Document 1.

$$\langle v_1 \rangle \leftarrow \text{Mult}(\langle x_1 \rangle, \langle x_2 \rangle)$$

$$\langle v_2 \rangle \leftarrow \text{Mult}(\langle x_4 \rangle, \langle x_5 \rangle)$$

$$\langle v_3 \rangle \leftarrow \text{Mult}(\langle v_1 \rangle, \langle x_3 \rangle)$$

$$\langle v_4 \rangle \leftarrow \text{Add}(\langle v_2 \rangle, \langle v_3 \rangle)$$

$$\langle y \rangle \leftarrow \langle v_4 \rangle \tag{5}$$

Here, in the secure computation protocol, the computation expression corresponding to a desired computation can be achieved by the combination of basic operation protocols indicating basic operation processing (for example, the addition protocol, the multiplication protocol, and the shared value multiplication protocol). On the other hand, in order to secure the safety in the secure computation protocol, it is necessary that the shared values as the input values of the computation expression protocol corresponding to the computation expression be independent of the shared values as the output value of the computation expression protocol, and that the output value be distributed uniformly among the computation parties. Accordingly, the common method described in Non-Patent Document 1 is designed such that the addition protocol and the multiplication protocol which are used as basic operation protocols satisfy such conditions. Specifically, the multiplication protocol includes the re-distribution protocol by which the shared values are re-distributed to each of the computation parties so as to secure the independence thereof. However, with the common method, when configuring the computation expression from the basic operation protocols, in a case in which a plurality of the multiplication protocols are included, a large number of the re-distribution protocols which are protocols with communication among the parties are executed, and accordingly, the communication traffic might increase.

In contrast, in the common method, since the computation expression protocol corresponding to the computation expression is simply configured from the combination of the addition protocol and the multiplication protocol, the re-distribution protocols having the same function are executed in an overlapping manner in some cases, for example, so that the computation expression protocol is not always optimized. Accordingly, by re-arranging the re-distribution protocol at an appropriate position in the computation expression protocol, the secure computation protocol may be more efficient and the communication traffic may be reduced.

Accordingly, in the present embodiment, as the basic operation protocol, the shared value multiplication protocol is introduced, which is a protocol obtained by removing the re-distribution protocol from the multiplication protocol. Further, after the computation expression protocol corresponding to the computation expression is created from the addition protocol and the shared value multiplication protocol, by re-arranging the re-distribution protocol at an appropriate position, that is, a position by which the independence of the shared values is maintained, a more efficient secure computation protocol (improved secure computation protocol) is created.

Here, considering the position at which the re-distribution protocol is arranged, the output value and the input value will not be independent of each other after the shared value multiplication protocol in which the shared values are transmitted and received among the computation parties is performed. Note that, even after the shared value multiplication protocol is performed, at a stage in which each computation party keeps holding the shared values as the computation results locally, the security is not inhibited even when the shared values are dependent on the input values. However, after that, when the shared values are transmitted to another computation party, the security might be inhibited. The shared values are transmitted and received among the computation parties when the shared value multiplication protocol is executed and when the shared values with respect to the final output value are generated. Accordingly, in the present embodiment, in a case in which the shared value multiplication protocol is executed and then there is an operation of transmitting the results to another computation party, the arrangement position of the re-distribution protocol is decided such that the re-distribution protocol is executed before the results are transmitted to the another computation party. Specifically, the algorism described in the above (4-2. Details of information processing method) enables specification of the position at which such a re-distribution protocol is expected to be executed (that is, the appropriate position of the re-distribution protocol).

As described above, the improved computation expression protocol obtained by the present embodiment is the above expression (4). In contrast, the computation expression protocol that can be executed by the common method is the above expression (5). When the expression (4) and the expression (5) are compared with each other, the re-distribution protocol is executed six times in the expression (5), whereas the re-distribution protocol is executed only twice in the expression (4). In this manner, according to the present embodiment, it becomes possible to reduce the number of times of the re-distribution protocol, which is a protocol with communication, so that the execution time of the secure computation protocol can be shortened. Further, since the secure computation protocol is arranged appropriately at a necessary position to maintain the independence of the shared values, the confidentiality of the secret input values can be secured while the execution time is shortened.

5. Application Examples

The secure computation protocol according to the present embodiment can be applied favorably in order to perform certain processing in a state in which a plurality of pieces of information managed in separate systems, for example, are kept confidential from one another of the systems. For example, in the near future, the fluidity of personal data of users will be increased and the personal data will be actively used. In such a situation, the protection of privacy information of users will become more important. In such a case, by use of the secure computation protocol, it becomes possible to perform statistical analysis or knowledge extraction (so-called data mining) without gathering pieces of the personal data of users located in a plurality of systems to one place. Accordingly, there is an advantage of decentralizing the risk of leak of information and preventing the extraction of privacy information more than necessary. Here, some application examples of the secure computation protocol according to the present embodiment will be described.

(5-1. Secondary Use of Medical Information)

The secure computation protocol according to the present embodiment can be favorably applied when medial information is analyzed in various ways. Here, the medial information may be information that is usually supposed to be written on medical records, such as basic data showing the medical history, the age, and the physical state of patients, for example. Such medical information is individual information of the patients, and is not supposed to be taken out of the system in the hospital, for example, that manages the medical information, considering the protection of privacy information. On the other hand, if a large number of pieces of medical information are united to perform statistical processing, useful data for medical treatment may be obtained. According to the present embodiment, it becomes possible to perform analysis processing of the medial information without leaking the medical information to other systems than the system that manages the medical information.

(5-1-1. Data Mining Based on Medical Information)

Figure 9:
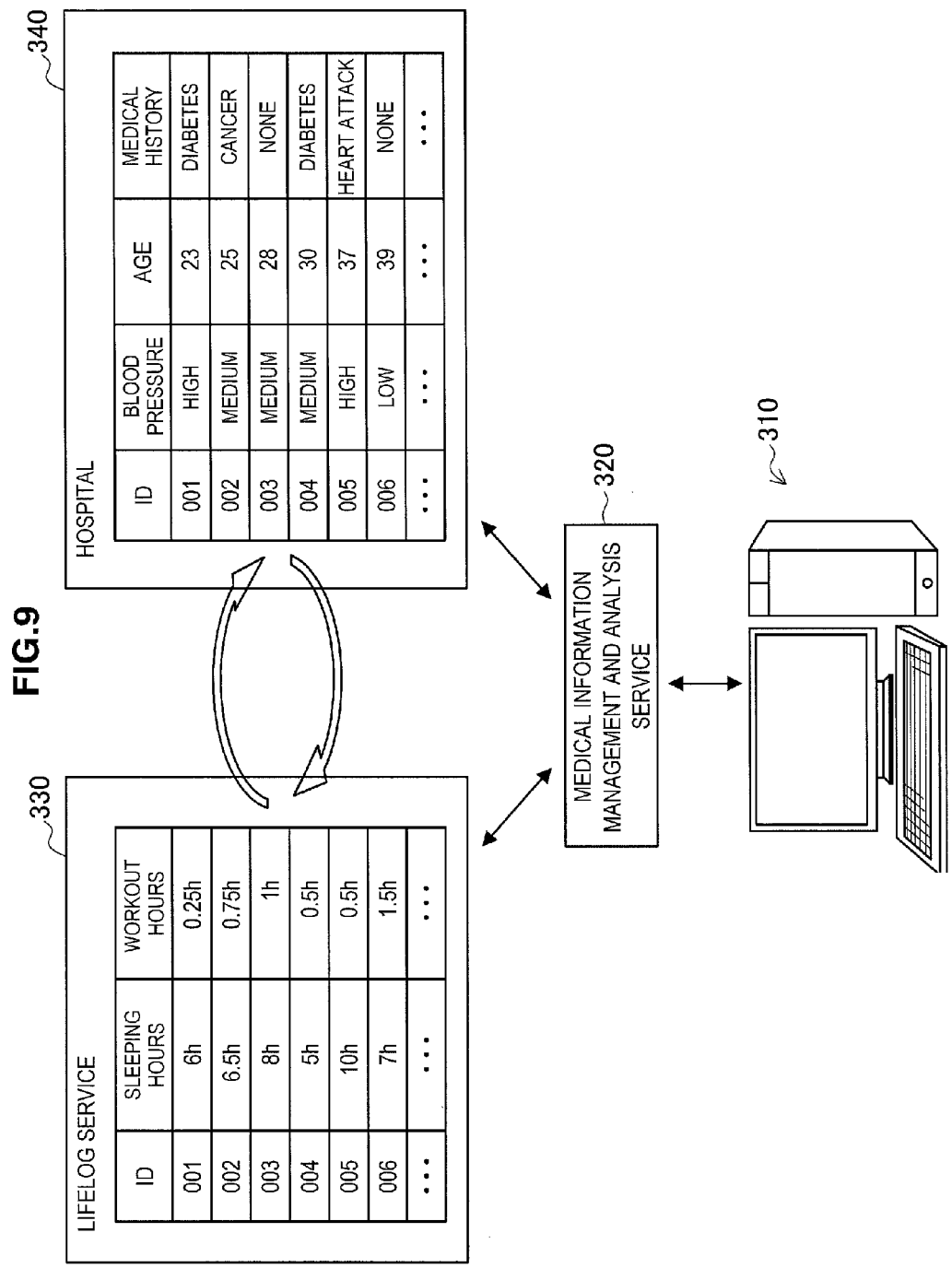
FIG. 9 shows data mining based on medical information using a secure computation protocol according to an embodiment.

First, data mining based on medical information using the secure computation protocol according to the present embodiment will be described with reference to FIG. 9. FIG. 9 shows data mining based on medical information using the secure computation protocol according to the present embodiment. In data mining, by comprehensively analyzing pieces of information scattered in a plurality of systems, new information is obtained.

Referring to FIG. 9, in this application example, an analysis target is lifelogs of users managed by a lifelog service 330 and medical information of patients managed by a hospital 340. The lifelog service 330 can manage various pieces of information (lifelog) related to lives of users. The lifelog may be recorded actively by the user or may be recorded automatically by a variety of sensors provided on a mobile terminal such as a smartphone or a wearable terminal used by being worn on the user, for example. In the example shown in FIG. 9, the lifelog service 330 records information about sleeping hours, workout hours, and the like of users as lifelogs.

At the same time, the hospital 340 manages medical information of patients who have visited the hospital 340. In the example shown in FIG. 9, in the hospital 340, information about blood pressures, ages, medical histories, and the like of patients is recorded as medical information. The lifelog service 330 and the hospital 340 cooperate with each other, and can identify an individual on the basis of the ID of the user and the ID of the patient. However, it is preferable that the lifelogs and medical information owned by the lifelog service 330 and the hospital 340 are not disclosed to each other, considering the protection of privacy information. In such a case, as a technique of performing analysis while the lifelog and medical information are kept confidential from each other of the parties, the secure computation protocol can be favorably applied.

In this application example, the lifelog service 330 and the hospital 340 serve as both the inputters and the computation parties in the secure computation protocol, and execute the secure computation protocol on the basis of lifelogs and medical information provided as shared values from the lifelog service 330 and the hospital 340. Accordingly, various kinds of analysis processing using the lifelogs and medical information can be performed while the lifelogs and medical information are kept confidential from each other of the parties.

A medical information management and analysis service 320 manages the execution of the secure computation protocol by the lifelog service 330 and the hospital 340. Further, the medical information management and analysis service 320 may be the output value obtainer in the secure computation protocol, and can provide results of the execution of the secure computation protocol to an information processing apparatus terminal 310 (showing one user schematically) which will be described later. For example, the medical information management and analysis service 320 generates the secure computation protocol, distributes the generated secure computation protocol to the lifelog service 330 and the hospital 340, and executes the secure computation protocol. When the secure computation protocol is generated in the medical information management and analysis service 320, the technique according to the present embodiment can be favorably applied. The application of the technique according to the present embodiment can shorten the execution time of the secure computation protocol in the lifelog service 330 and the hospital 340, and various kinds of analysis can be performed on the basis of the lifelog and medical information in a short time.

The information processing apparatus terminal 310 denotes a user who wants to obtain certain analysis results based on the lifelogs and the medical information. The user can access the medical information management and analysis service 320 to obtain any kinds of analysis results based on the lifelogs and the medication information, such as the relation between the blood pressure and the sleeping hours, the relation between the medical history and the workout hours, and the like.

Note that this application example is not limited to the above configuration example, and the medical information management and analysis service 320 may participate as a computation party in addition to the lifelog service 330 and the hospital 340, and the three parties may execute the secure computation protocol. Further, the medical information management and analysis service 320 may not exist, and the information processing apparatus terminal 310 (that is, the user) may access any of the lifelog service 330 and the hospital 340 directly to obtain results of the execution of the secure computation protocol. In this case, any one of the lifelog service 330 and the hospital 340 also serves as the output value obtainer.

(5-1-2. Statistical Analysis Processing of Medical Information)

Figure 10:
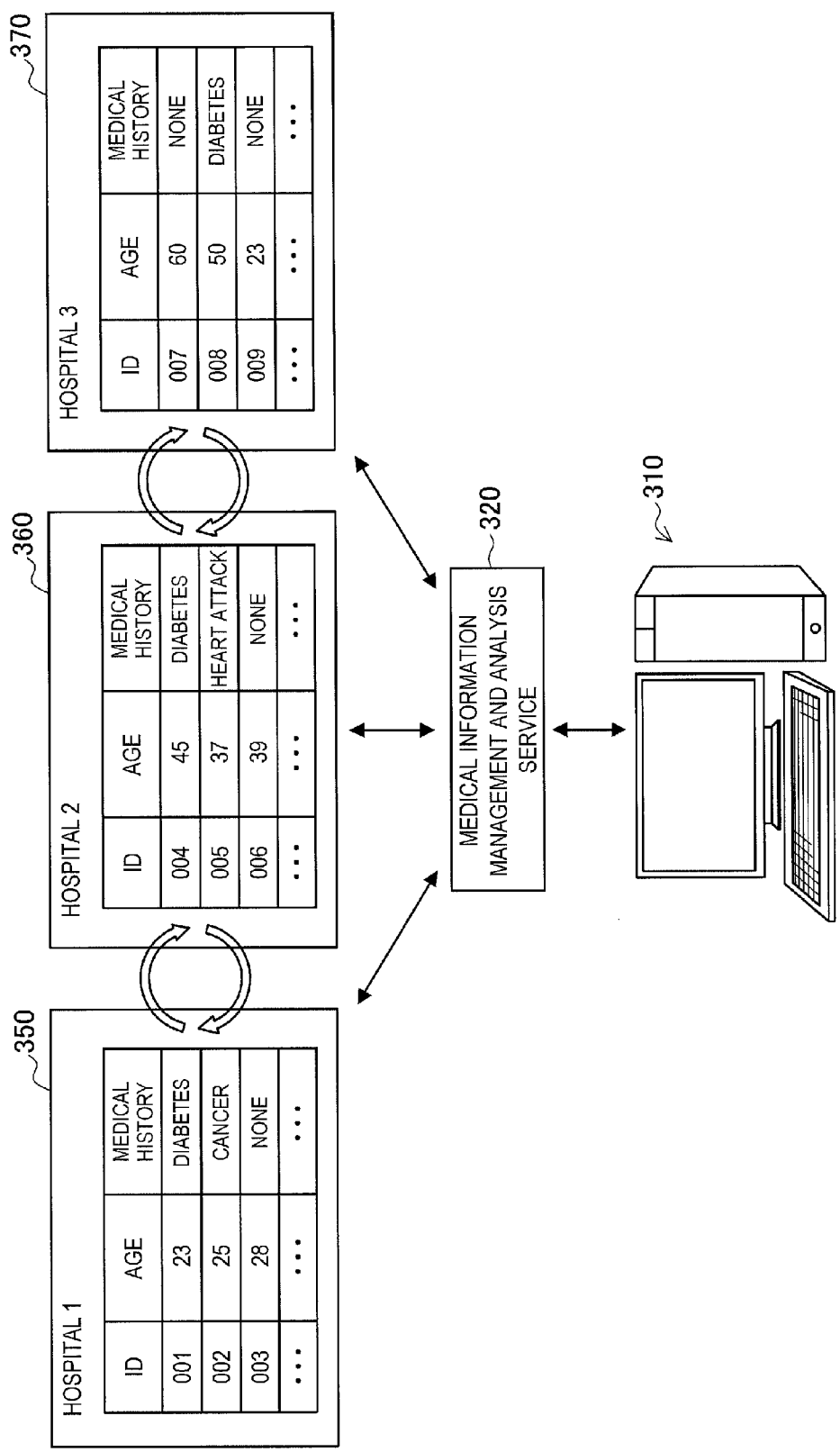
FIG. 10 shows statistical analysis processing of medical information using a secure computation protocol according to an embodiment.

Next, statistical analysis processing of medical information using the secure computation protocol according to the present embodiment will be described with reference to FIG. 10. FIG. 10 shows statistical analysis processing of medical information using the secure computation protocol according to the present embodiment.

Referring to FIG. 10, in this application example, the analysis target is medical information of patients managed in mutually different hospitals 350, 360, and 370. In the example shown in FIG. 10, the hospitals 350, 360, and 370 record information on ages, medical histories, and the like of patients as medical information. The medical information of patients is high-privacy information that should be managed strictly. On the other hand, for example, by performing various kinds of statistical analysis on the medical information, useful information may be obtained, such as tendency of age, sex, or the like with which a person is likely to have a certain illness. In this application example, by use of the secure computation protocol, it becomes possible to perform analysis processing on the medical information without disclosing medical information of patients managed by the hospitals 350, 360, and 370.

In this application example, the hospitals 350, 360, and 370 serve as both the inputters and the computation parties in the secure computation protocol, and execute the secure computation protocol on the medical information provided as shared values from the hospitals 350, 360, and 370. Accordingly, various kinds of analysis processing using the medical information can be performed while the medical information managed by the hospitals 350, 360, and 370 are kept confidential from one another of the parties.

The medical information management and analysis service 320 manages the execution of the secure computation protocol by the 1 hospitals 350, 360, and 370. Further, the medical information management and analysis service 320 may be the output value obtainer in the secure computation protocol, and can provide results of the execution of the secure computation protocol to the information processing apparatus terminal 310 (showing one user schematically). For example, the medical information management and analysis service 320 generates the secure computation protocol, distributes the generated secure computation protocol to the hospitals 350, 360, and 370, and executes the secure computation protocol. When the secure computation protocol is generated in the medical information management and analysis service 320, the technique according to the present embodiment can be favorably applied. The application of the technique according to the present embodiment can shorten the execution time of the secure computation protocol in the hospitals 350, 360, and 370, and various kinds of analysis can be performed on the basis of the medical information in a short time.

The information processing apparatus terminal 310 denotes a user who wants to obtain certain analysis results based on the medical information. The user can access the medical information management and analysis service 320 to obtain any kinds of statistical information based on the medication information, such as the average age, sex, and the like of patients of a certain illness.

Note that this application example is not limited to the above configuration example, and the medical information management and analysis service 320 may participate as a computation party in addition to the hospitals 350, 360, and 370, and the four parties may execute the secure computation protocol. Further, the medical information management and analysis service 320 may not exist, and the information processing apparatus terminal 310 (that is, the user) may access any of the hospitals 350, 360, and 370 directly to obtain results of the execution of the secure computation protocol. In this case, any one of the hospitals 350, 360, and 370 also serves as the output value obtainer.

The case in which the secure computation protocol is used in various kinds of analysis processing of medical information has been described above. Note that the lifelogs and medical information shown in FIG. 9 and FIG. 10 are examples, and any kinds of information may be used as the input value that can be usually managed as the lifelogs and medical information in the analysis using the secure computation protocol according to the present embodiment.

(5-2. Recommend Service)

Figure 11:
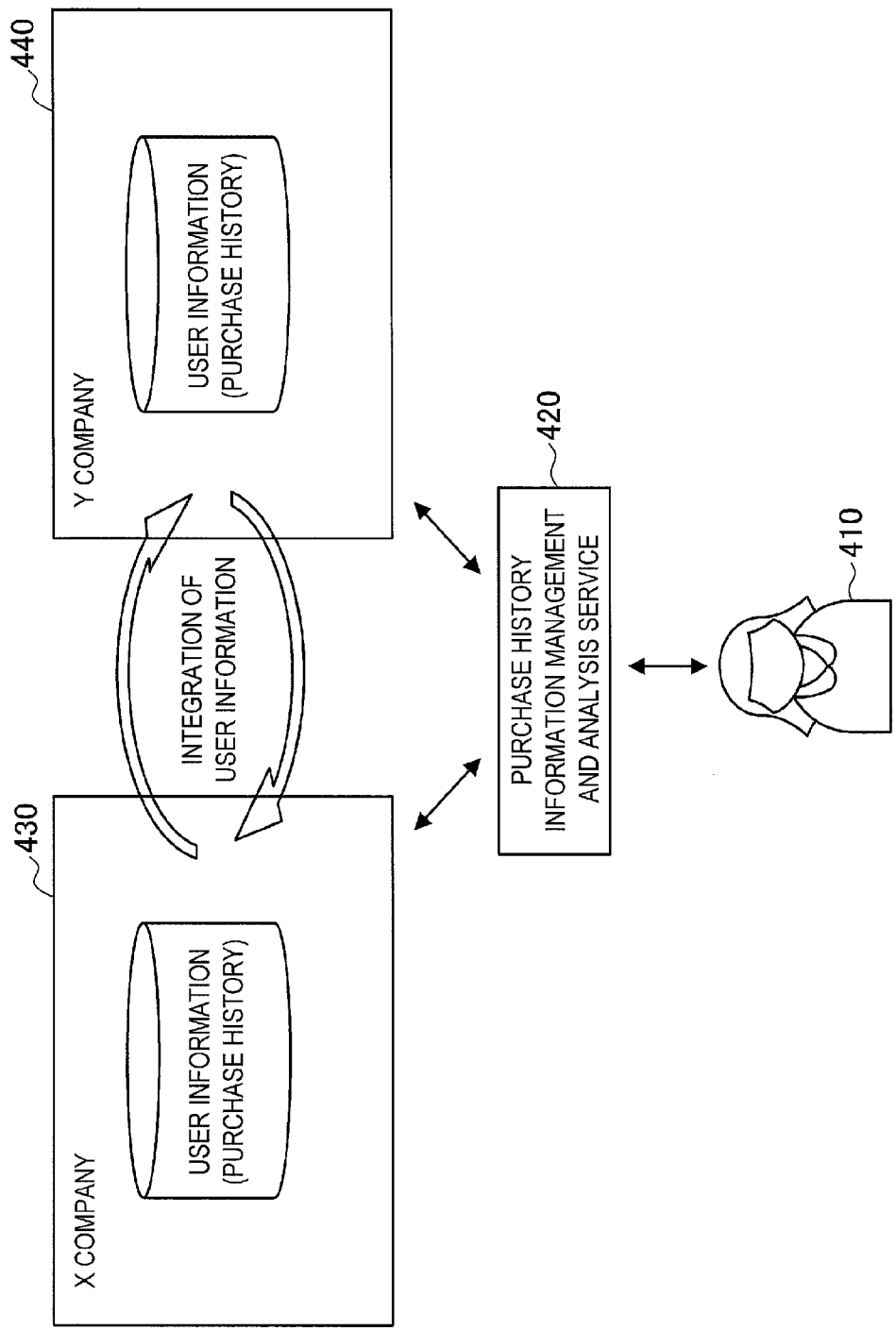
FIG. 11 shows analysis processing in a recommend service using a secure computation protocol according to an embodiment.
Figure 12:
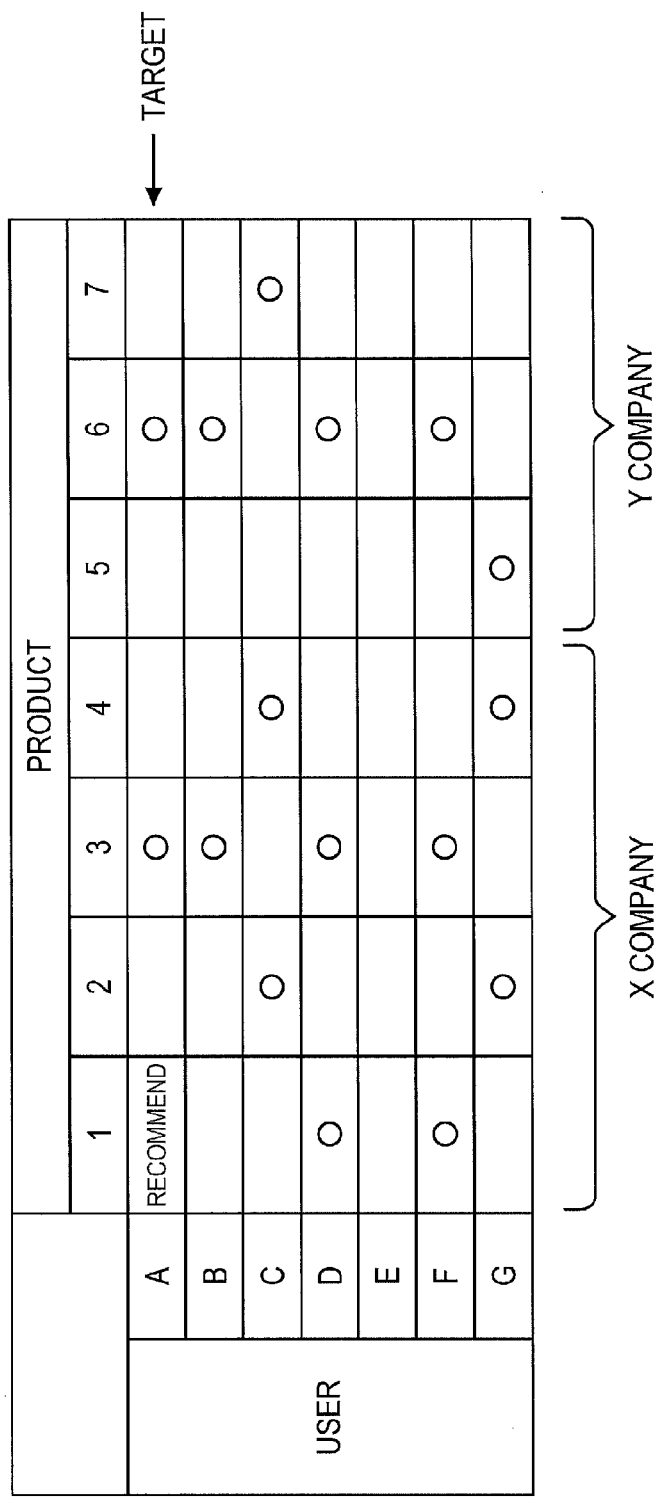
FIG. 12 shows analysis processing in a recommend service using a secure computation protocol according to an embodiment.

The secure computation protocol according to the present embodiment can be favorably applied when a preference of a user is analyzed in a recommend service, which is a service that analyzes preferences of users and provides information that may be suitable on the basis of the analysis results according to the users. The analysis processing in the recommend service using the secure computation protocol according to the present embodiment will be described with reference to FIG. 11 and FIG. 12. FIG. 11 and FIG. 12 each show the analysis processing in the recommend service using the secure computation protocol according to the present embodiment.

Referring to FIG. 11, in this application example, the analysis target is purchase history information of each user managed by an X company 430 and purchase history information of each user managed by another company, a Y company 440. For example, the purchase history information managed by the X company 430 and the purchase history information managed by the Y company 440 are information on products that have been purchased by each user via mutually different services. In this case, considering the protection of privacy information, it is not preferable that the X company 430 and the Y company 440 provide the purchase history information owned by the X company 430 and the Y company 440 to each other in order to analyze the preference of a certain user 410. However, the use of the purchase history information owned by the X company 430 and the purchase history information owned by the Y company 440 may enable more accurate analysis on the preference of the user 410. By such analysis with more accuracy, a product that may interest the user 410 more will be recommended to the user 410, which is advantageous for both the X company 430 and the Y company 440 that recommend products and the user 410 who purchases products.

In this application example, the X company 430 and the Y company 440 serve as both the inputters and the computation parties in the secure computation protocol, and execute the secure computation protocol on the basis of the purchase history information provided as shared values from the X company 430 and the Y company 440. Accordingly, various kinds of analysis processing using the purchase history information (for example, analysis processing of the preference of the user 410) can be performed while the purchase history information managed by the X company 430 and the Y company 440 are kept confidential from each other of the parties.

A purchase history information management and analysis service 420 manages the execution of the secure computation protocol by the X company 430 and the Y company 440. Further, the purchase history information management and analysis service 420 may be the output value obtainer in the secure computation protocol, and can provide, on the basis of information on the preference of the user 410 as results of the execution of the secure computation protocol, information related to advertisement, recommendation, notification, and the like of a product to the user 410. For example, the purchase history information management and analysis service 420 generates the secure computation protocol, distributes the generated secure computation protocol to the X company 430 and the Y company 440, and executes the secure computation protocol. When the secure computation protocol is generated in the purchase history information management and analysis service 420, the technique according to the present embodiment can be favorably applied. The application of the technique according to the present embodiment can shorten the execution time of the secure computation protocol in the X company 430 and the Y company 440, and various kinds of analysis can be performed on the basis of the purchase history information in a short time.

Note that this application example is not limited to the above configuration example, and the purchase history information management and analysis service 420 may participate as a computation party in addition to the X company 430 and the Y company 440, and the three parties may execute the secure computation protocol. Further, the purchase history information management and analysis service 420 may not exist, and the information related to advertisement, recommendation, notification, and the like of a product based on results of the execution of the secure computation protocol may be provided for the user 410 directly from any of the X company 430 and the Y company 440. In this case, any one of the X company 430 and the Y company 440 also serves as the output value obtainer.

FIG. 12 shows an example of specific processing of the secure computation protocol that can be executed in this application example. In the table shown in FIG. 12, each row represents a user and each column represents a type of a product. Cells with a circle shown in FIG. 12 denote that the relevant user has purchased the relevant product. That is, the table shown in FIG. 12 shows the purchase history of each user. Here, for example, the X company 430 manages the purchase history information on products 1 to 4, and the Y company 440 manages the purchase history information on products 5 to 7.

For example, let us assume that a user A is a target to whom a product is recommended. In this application example, the purchase history of products purchased by each user is shown as a vector (hereinafter also referred to as product purchase vector), and a correlation quantity between the product purchase vectors (for example, a Jaccard index) of the user who is a target to whom a product is recommended (user A) and the other users (user B to user G) is computed. Then, by using the correlation quantity as weight, product purchase vectors of the other users (user B to user G) are added together, thereby a product that is recommended to the user (user A) who is a target to whom a product is recommended is estimated.

Specifically, as for each row of the table shown in FIG. 12, by expressing the circle as "1" and a vacant cell as "0", the product purchase vector of each user is obtained. For example, the product purchase vector of the user A is (0,0,1,0,0,1,0) and the product purchase vector of the user D is (1,0,1,0,0,1,0).

Next, the correlation quantity between the product purchase vector of the user A and the product purchase vectors of all the other users B to G is computed. Here, as an example of the correlation quantity, a case of computing the Jaccard index is shown. However, this application example is not limited to this example, and any kinds of values showing correlation may be computed as the correlation quantity between the product purchase vectors.

In the case of this application example, the Jaccard index can be defined as (the number of types of products that have been purchased by two users (that is, "AND" of the purchased products of the two users))/(the total number of types of products that have been purchased by each user (that is, "OR" of the purchased products of the two users)), so that the Jaccard index of the user A and the user D, for example, is ⅔. In a similar manner, the Jaccard indexes are computed between the user A and all the other users B to G.

Next, by using the computed Jaccard indexes as weight, the product purchase vectors of the users B to G are added together. In the example shown in FIG. 12, (1×(0,0,1,0,0,1,0)+⅔×(1,0,1,0,0,1,0)+ . . . +0×(0,1,0,1,1,0,0)) is computed. Among elements of the vector obtained from the computation, a product corresponding to the element having the largest value can be selected as the product that is recommended to the user A. In the example shown in FIG. 12, as the product recommended to the user A, a product 1 is selected.

The case in which the secure computation protocol is applied to the analysis processing in the recommend service has been described above.

(5-3. Auction)

The secure computation protocol according to the present embodiment can be favorably applied to processing of deciding the successful bidder and/or the highest hid price in an auction of a so-called sealed bid auction, in which presented prices (bid prices) of buyers (bidders) are not mutually disclosed. The processing of deciding the successful bidder and/or the highest bid price in an auction using the secure computation protocol according to the present embodiment will be described with reference to FIG. 13.

Figure 13:
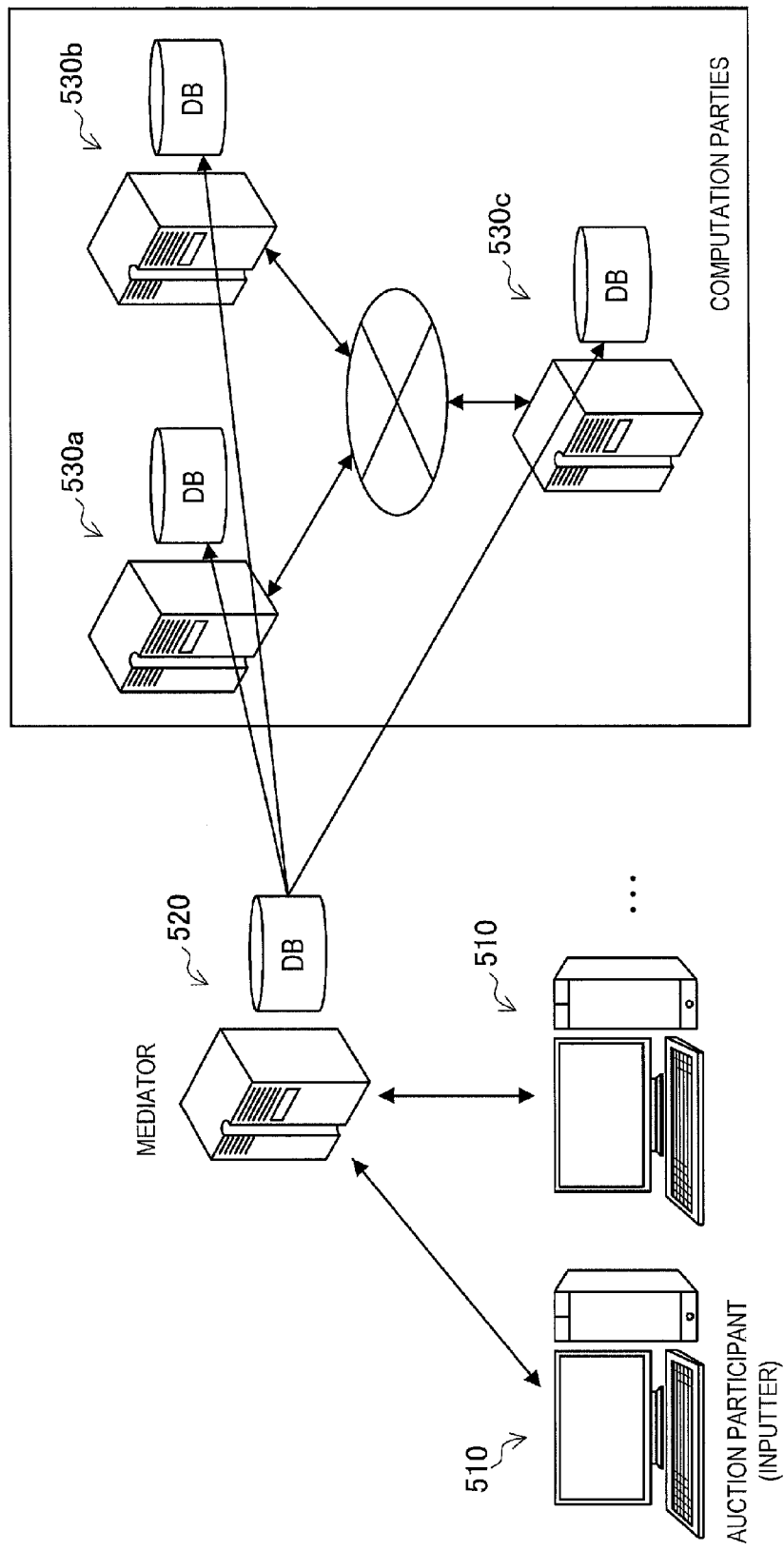
FIG. 13 shows the processing of deciding a successful bidder and/or a highest hid price in an auction using a secure computation protocol according to an embodiment.

FIG. 13 shows the processing of deciding the successful bidder and/or the highest hid price in an auction using the secure computation protocol according to the present embodiment.

Referring to FIG. 13, in this application example, information (bid price information) on the bid price of a bidder (auction participant) 510 is the target of the processing in the secure computation protocol. For example, in a case in which a plurality of auction participants 510 are interested parties with respect to a product of the target of the successful bid, in order to execute the auction fairly, it is preferable that the bid prices are not disclosed to one another of the auction participants 510. In this application example, by use of the secure computation protocol, it becomes possible to perform processing with respect to the bid price information without disclosing the bid price information of the auction participants 510 to one another. Specifically, the secure computation protocol is executed by using the bid price information of the auction participants 510 as the input values (secret input values).

In the example shown in FIG. 13, the auction participants 510 serve as the inputters in the secure computation protocol, and bid price information from the plurality of auction participants 510 is accumulated in an mediator 520 as secret input values. In this application example, before the bid price information is transmitted from the auction participants 510 to the mediator 520, the bid price information is distributed to be shared value. The mediator 520 has a role of mediating the auction participants 510 and computation parties 530*a*, 530*b*, and 530*c*, and inputs the shared values of the bid price information transmitted from the auction participants 510 to each of the computation parties 530*a*, 530*b*, and 530*c*. Note that when the shared values of the bid price information are transmitted from the auction participants 510 to the mediator 520, for example, the shared values of the bid price information are encoded as appropriate, so that the mediator 520 is not allowed to decode the bid price information from the shared values. Here, the mediator 520 may have a role of managing the execution of the secure computation protocol, and may generate the secure computation protocol, distribute the generated secure computation protocol to the computation parties 530*a*, 530*b*, and 530*c*, and execute the secure computation protocol, for example.

When the shared values of the bid price information as secret input values are inputted from the mediator 520, in the computation parties 530*a*, 530*b*, and 530*c*, the secure computation protocol is executed on the basis of the shared values of the bid price information, and results of the auction, such as the successful bidder and the highest bid price, are outputted. By applying the technique according to the present embodiment to the secure computation protocol, it becomes possible to perform processing to obtain the results of the auction in a short time. Note that FIG. 13 shows the case in which three computation parties 530*a*, 530*b*, and 530*c* execute the secure computation protocol as an example; however, a different number of computation parties may execute the secure computation protocol.

Some application examples in which the secure computation protocol according to the present embodiment can be favorably applied have been described above. In a case in which certain processing is performed by integrating plural pieces of information managed in the above described separate systems, by applying the secure computation protocol according to the present embodiment, it becomes possible to execute the certain processing in a short time in a state in which the pieces of information are kept confidential from each system. Accordingly, a more convenient service can be provided for users.

6. Hardware Configuration

Next, a hardware configuration of an information processing apparatus according to the present embodiment will be described with reference to FIG. 14. FIG. 14 is a functional block diagram showing an example of the hardware configuration of the information processing apparatus according to the present embodiment. Note that an information processing apparatus 900 shown in FIG. 14 may achieve the operation processing apparatus that can form the inputters $D_1$ and $D_2$ and the computation parties $P_1$, $P_2$, and $P_3$ shown in FIG. 4 and FIG. 5, and the information processing apparatus 10 and the operation processing apparatus 20 shown in FIG. 6.

The information processing apparatus 900 mainly includes a CPU 901, a ROM (read only memory) 903, and a RAM (random access memory) 905. Furthermore, the information processing apparatus 900 also includes a host bus 907, a bridge 909, an external bus 911, an interface 913, an input device 915, an output device 917, a storage device 919, a communication device 921, a drive 923, and a connection port 925. The information processing apparatus 900 may include a processing circuit called DSP or ASIC (application specific integrated circuit) instead of or together with the CPU 901.

The CPU 901 serves as an operation processing apparatus and a control device, and controls the overall operation or a part of the operation of the information processing apparatus 900 according to various programs recorded in the ROM 903, the RAM 905, the storage device 919, or a removable recording medium 929. The ROM 903 stores programs, operation parameters, and the like used by the CPU 901. The RAM 905 primarily stores programs used in the execution of the CPU 901 and parameters and the like during the execution. The CPU 901, the ROM 903, and the RAM 905 are connected with each other via the host bus 907 configured from an internal bus such as a CPU bus or the like. Further, the host bus 907 is connected to the external bus 911 such as a PCI (peripheral component interconnect/interface) bus via the bridge 909. In the present embodiment, for example, the CPU 901 being operated according to a certain program, the above described functions of each of the information processing apparatus 10 and operation processing apparatus 20 can be achieved.

The host bus 907 is connected to the external bus 911 such as a PCI (peripheral component interconnect/interface) bus via the bridge 909.

The input device 915 is configured from devices that are operated by a user, such as a mouse, a keyboard, a touch panel, buttons, a switch, and a lever. Also, the input device 915 may be a remote control device (a so-called remote control) using, for example, infrared light or other radio waves, or may be an externally connected device 931 such as a mobile phone or a PDA conforming to the operation of the information processing apparatus 900. Furthermore, the input device 915 generates an input signal based on, for example, information which is inputted by a user with the above operation device, and is configured from an input control circuit for outputting the input signal to the CPU 901. The user of the information processing apparatus 900 can input various kinds of data to the information processing apparatus 900 and can instruct the information processing apparatus 900 to perform processing by operating this input apparatus 915. In the present embodiment, the user may input information on the computation expression, information on the secret input value, various parameters related to the secure computation protocol, and the like, via the input device 915, for example.

The output device 917 is configured from a device capable of visually or audibly notifying acquired information to a user. Examples of such a device include display devices such as a CRT display device, a liquid crystal display device, a plasma display device, an EL display device, and lamps, audio output devices such as a speaker and a headphone, a printer and the like. For example, the output device 917 outputs a result obtained by various kinds of processing performed by the information processing apparatus 900. More specifically, the display device displays, in the form of texts, images, tables, graphs, and the like, a result obtained by various kinds of processing performed by the information processing apparatus 900. In the present embodiment, the display device may display results of the execution of the secure computation protocol, for example. On the other hand, the audio output device converts an audio signal such as reproduced audio data and sound data into an analog signal, and outputs the analog signal audibly.

The storage device 919 is a device for storing data configured as an example of a storage unit of the information processing apparatus 900. The storage device 919 is configured from, for example, a magnetic storage device such as a HDD, a semiconductor storage device, an optical storage device, or a magneto-optical storage device. This storage device 919 stores programs to be executed by the CPU 901, various kinds of data, and various kinds of data obtained from the outside. In the present embodiment, for example, the storage device 919 may store various kinds of information related to the secure computation protocol (such as information on the computation expression, information on the secret input values (shared value), information obtained in the computation process of the secure computation protocol, and/or information on results of the execution of the secure computation protocol).

The communication device 921 is a communication interface configured from, for example, a communication device for connecting to a communication network 927. The communication device 921 is, for example, a wired or wireless LAN (Local Area Network), Bluetooth (registered trademark), a communication card for WUSB (Wireless USB), or the like. Alternatively, the communication device 921 may be a router for optical communication, a router for ADSL (Asymmetric Digital Subscriber Line), a modem for various communications, or the like. This communication device 921 can transmit and receive signals and the like in accordance with a predetermined protocol such as TCP/IP on the Internet and with other communication devices, for example. The network 927 connected to the communication device 921 is configured from a network and the like, which is connected via wire or wirelessly, and may be, for example, the Internet, a home LAN, infrared communication, radio wave communication, satellite communication, or the like. In the present embodiment, for example, communication among the inputters $D_1$ and $D_2$ and the computation parties $P_1$, $P_2$, and $P_3$ shown in FIG. 4 and FIG. 5, communication among the computation parties $P_1$, $P_2$, and $P_3$, or communication between the information processing apparatus 10 and the operation processing apparatus 20 shown in FIG. 6 may be performed by the communication device 921 via the network 927.

The drive 923 is a reader/writer for recording medium, and is embedded in the information processing apparatus 900 or attached externally thereto. The drive 923 reads out information recorded in the attached removable recording medium 929 such as a magnetic disk, an optical disc, a magneto-optical disk, or a semiconductor memory, and outputs the read information to the RAM 905. Furthermore, the drive 923 can write information in the attached removable recording medium 929 such as a magnetic disk, an optical disc, a magneto-optical disk, or a semiconductor memory. The removable recording medium 929 is, for example, a DVD medium, an HD-DVD medium, or a Blu-ray (registered trademark) medium. The removable recording medium 929 may be a CompactFlash (CF; registered trademark), a flash memory, an SD memory card (Secure Digital Memory Card), or the like. Alternatively, the removable recording medium 929 may be, for example, an IC card (Integrated Circuit Card) equipped with a non-contact IC chip or an electronic appliance. In the present embodiment, for example, the above described various kinds of information related to the secure computation protocol may be read out from the removable recording medium 929 or written in the removable recording medium 929 by the drive 923.

The connection port 925 is a port for allowing devices to directly connect to the information processing apparatus 900. Examples of the connection port 925 include a USB (Universal Serial Bus) port, an IEEE1394 port, a SCSI (Small Computer System Interface) port, and the like. Other examples of the connection port 925 include an RS-232C port, an optical audio terminal, an HDMI (High-Definition Multimedia Interface, registered trademark) port, and the like. By the externally connected apparatus 931 connecting to this connection port 925, the information processing apparatus 900 directly obtains various kinds of data from the externally connected apparatus 931 and provides various kinds of data to the externally connected apparatus 931. In the present embodiment, for example, the above described various kinds of information related to the secure computation protocol may be acquired from the externally connected apparatus 931 or outputted to the externally connected apparatus 931 via the connection port 925.

The example of the hardware configuration that can achieve the functions of the information processing apparatus 900 according to the present embodiment has been described above. Each structural element described above may be achieved by using a general member or hardware specialized in the function of each structural element. Accordingly, the hardware configuration to be used can be changed as appropriate depending on the technical level when implementing the present embodiment.

Note that it is possible to create a computer program for performing the above described functions of the information processing apparatus 900 according to the present embodiment, and to install the computer program to a PC, for example. It is also possible to provide a computer-readable recording medium having such a computer program recorded thereon. Examples of the recording medium include a magnetic disk, an optical disc, a magneto-optical disk, a flash memory, and the like. The computer program may be distributed via a network, for example, instead of using the recording medium.

7. Protocols

Specific processing in the above described input value distribution protocol, addition protocol, multiplication protocol, re-distribution protocol, output value decoding protocol, and shared value multiplication protocol is shown below. Note that each protocol shown below corresponds to the above described Non-Patent Document 1, and in another secure computation protocol, a protocol in accordance with the scheme of the another secure computation protocol can be applied.

(Input Value Distribution Protocol)
    $<u> \leftarrow \text{Share}(u)$
    Data: Input value u ($\in Z_{2^n}$)
    Result: shared value $<u>=u_2, u_3)$ where $u=u_1+u_2+u_3$
    ($u_1$, $u_2$, and $u_3$ are shared values owned by $P_1$, $P_2$, and $P_3$, respectively)
    1. The inputter generates random values $u_1 \leftarrow Z_n$ and $u_2 \leftarrow Z_n$
    2. The inputter computes $u_1 \leftarrow u - u_1 - u_2$
    3. The inputter transmits $u_i$ (i=1, 2, 3) to $P_i$ (Addition Protocol)
    $<w> \leftarrow \text{Add}(<u>, <v>)$
    Data: shared values $<u>$ and $<v>$ owned by $P_1$, $P_2$, and $P_3$
    Result: shared value $<w>$ where $w=u+v$
    1. $P_1$ computes $w_1 \leftarrow u_1+v_1$
    2. $P_2$ computes $w_2 \leftarrow u_2+v_2$
    3. $P_3$ Computes $w_3 \leftarrow u_3+v_3$
    4. $<w>$ is returned (Multiplication Protocol)
    $<w'> \leftarrow \text{Mult}(<u>,<v>)$
    Data: shared values $<u>$ and $<v>$ owned by $P_1$, $P_2$, and $P_3$
    Result: shared value $<w'>$ where $w'=uv$
    1. $<u'> \leftarrow \text{Reshare}(<u>)$
    2. $<v'> \leftarrow \text{Reshare}(<v>)$
    3. $P_1$ transmits $u_1'$ and $v_1'$ to $P_2$
    4. $P_2$ transmits $u_2'$ and $v_2'$ to $P_3$
    5. $P_3$ transmits $u_3'$ and $v_3'$ to $P_1$
    6. $P_1$ computes $w_1 \leftarrow u_1'v_1'+u_1'v_3'+u_3'v_1'$
    7. $P_2$ computes $w_2 \leftarrow u_2'v_2'+u_2'v_1'+u_1'v_2'$
    8. $P_3$ Computes $w_3 \leftarrow u_3'v_3'+u_3'v_2'+u_2'v_3'$
    9. $<w'> \leftarrow \text{Reshare}(<w>)$ is returned (Re-Distribution Protocol)
    $<w> \leftarrow \text{Reshare}(<u>)$
    Data: shared value $<u>$ owned by $P_1$, $P_2$, and $P_3$
    Result: shared value $<w>$ where $w=u$
    1. $P_1$ generates random value $r_{12} \leftarrow Z_n$
    2. $P_2$ generates random value $r_{23} \leftarrow Z_n$
    3. $P_3$ generates random value $r_{31} \leftarrow Z_n$
    4. All the values $*_{ij}$ are transmitted from $P_i$ to $P_j$
    5. $P_1$ computes $w_1 \leftarrow u_1+r_{12}-r_{31}$
    6. $P_2$ computes $w_2 \leftarrow u_2+r_{23}-r_{12}$
    7. $P_3$ computes $w_3 \leftarrow u_3+r_{31}-r_{23}$
    8. $<w>$ is returned (Output Value Decoding Protocol)
    $w \leftarrow \text{Decode}(<w>)$
    Data: shared value $<w>=(w_1, w_2, w_3)$ owned by $P_1$, $P_2$, and $P_3$
    Result: $w=w_1+w_2+w_3$
    1. Transmit $w_i$ (i=1, 2, 3) from $P_i$ to output value obtainer
    2. Output value obtainer computes $w=w_1+w_2+w_3$ (Shared Value Multiplication Protocol)
    $<w> \leftarrow \text{Mult2}(<u>, <v>)$
    Data: shared values $<u>$ and $<v>$ owned by $P_1$, $P_2$, and $P_3$
    Result: shared value $<w>$ where $w=uv$
    1. $P_1$ transmits $u_1$ and $v_1$ to $P_2$
    2. $P_2$ transmits $u_2$ and $v_2$ to $P_3$
    3. $P_3$ transmits $u_3$ and $v_3$ to $P_1$
    4. $P_1$ computes $w_1 \leftarrow u_1v_1+u_1v_3+u_3v_1$
    5. $P_2$ computes $w_2 \leftarrow u_2v_2+u_2v_1+u_1v_2$
    6. $P_3$ computes $w_3 \leftarrow u_3v_3+u_3v_2+u_2v_3$

8. Supplemental Remarks

Hereinabove, although the preferred embodiments of the present disclosure have been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below:

(1) An information processing apparatus including:
- a first computation protocol generation unit configured to generate a first computation protocol that does not include a confidentiality securing protocol that is executed in order to maintain confidentiality of a plurality of input values on the basis of a secure computation protocol in which a plurality of operation processing apparatuses compute an output value on the basis of the input values; and
- a second computation protocol generation unit configured to generate a second computation protocol by arranging the confidentiality securing protocol to a position at which the confidentiality is secured in the first computation protocol.

(2) The information processing apparatus according to (1), wherein the second computation protocol generation unit arranges the confidentiality securing protocol after at least any one of steps of processing with communication among the operation processing apparatuses in the first computation protocol.

(3) The information processing apparatus according to (1) or (2),
wherein, in a case in which first processing with communication among the operation processing apparatuses in the first computation protocol is performed and then second processing with communication among the operation processing apparatuses is performed, the second computation protocol generation unit arranges the confidentiality securing protocol between the first processing and the second processing.

(4) The information processing apparatus according to any one of (1) to (3),
wherein each of the plurality of operation processing apparatuses has a shared value obtained by distributing each of the plurality of input values and executes the secure computation protocol by using the shared value.

(5) The information processing apparatus according to (4),
wherein the confidentiality securing protocol is a re-distribution protocol that transforms the shared values to different shared values while holding values of the input values.

(6) The information processing apparatus according to (5),
wherein the second computation protocol generation unit arranges the re-distribution protocol after at least any one of steps of processing with communication of the shared values among the operation processing apparatuses in the first computation protocol.

(7) The information processing apparatus according to (5) or (6),
wherein, in a case in which first processing with communication of the shared values among the operation processing apparatuses in the first computation protocol is performed and then second processing with communication of the shared values among the operation processing apparatuses is performed, the second computation protocol generation unit arranges the confidentiality securing protocol between the first processing and the second processing.

(8) The information processing apparatus according to any one of (1) to (7),
wherein the first computation protocol generation unit includes
- a computation expression decomposition unit configured to decompose a computation expression to certain operation processing, the computation expression being used for computation in the secure computation protocol, and
- an operation protocol assignment unit configured to assign, to the decomposed computation expression, an operation protocol that corresponds to the certain operation processing and does not include the confidentiality securing protocol.

(9) The information processing apparatus according to (8),
wherein the computation expression decomposition unit decomposes the computation expression to basic operation processing which is the minimum unit of operation processing, and
wherein the operation protocol assignment unit assigns a basic operation protocol corresponding to the basic operation processing to the decomposed computation expression.

(10) The information processing apparatus according to (9),
wherein the basic operation processing is any of addition and multiplication on a ring of integers.

(11) The information processing apparatus according to any one of (1) to (10),
wherein the operation processing apparatuses and the information processing apparatus are formed integrally.

(12) The information processing apparatus according to any one of (1) to (11),
wherein the input values are medical information that is managed in mutually different systems, and
wherein in the secure computation protocol, a statistical value of the medical information is computed.

(13) The information processing apparatus according to any one of (1) to (11),
wherein the input values are purchase history information on user's purchase of products, the information being managed in mutually different systems, and
wherein in the secure computation protocol, a preference of the user is analyzed on the basis of the purchase history information.

(14) The information processing apparatus according to any one of (1) to (11),
wherein the input values are bid price information that is inputted by a plurality of bidders in an auction, and
wherein in the secure computation protocol, at least one of a highest bid price and a successful bidder of a target product is decided on the basis of the bid price information.

(15) An information processing method including:
generating, by a processor, a first computation protocol that does not include a confidentiality securing protocol that is executed in order to maintain confidentiality of a plurality of input values on the basis of a secure computation protocol in which a plurality of operation processing apparatuses compute an output value on the basis of the input values; and generating, by a processor, a second computation protocol by arranging the confidentiality securing protocol to a position at which the confidentiality is secured in the first computation protocol.

(16) A recording medium having a program recorded thereon for causing a processor of a computer to execute:
a function of generating a first computation protocol that does not include a confidentiality securing protocol that is executed in order to maintain confidentiality of a plurality of input values on the basis of a secure computation protocol in which a plurality of operation processing apparatuses compute an output value on the basis of the input values; and
a function of generating a second computation protocol by arranging the confidentiality securing protocol to a position at which the confidentiality is secured in the first computation protocol.

What is claimed is:
1. An information processing apparatus, comprising:
one or more processors configured to:
generate a first computation protocol that excludes a confidentiality securing protocol that is executed to maintain confidentiality of a plurality of input values on the basis of a secure computation protocol in which a plurality of operation processing apparatuses compute an output value on the basis of the input values; and
generate a second computation protocol that arranges the confidentiality securing protocol to a position at which the confidentiality of the plurality of input values is secured in the first computation protocol,
wherein the one or more processors are further configured to:
decompose a computation expression to certain operation process, wherein the computation expression is used for computation in the secure computation protocol, and
assign, to the decomposed computation expression, an operation protocol that corresponds to the certain operation process and further excludes the confidentiality securing protocol.

2. The information processing apparatus according to claim 1,
wherein the one or more processors are configured to arrange the confidentiality securing protocol after at least any one of steps of processing with communication among the operation processing apparatuses in the first computation protocol.

3. The information processing apparatus according to claim 1,
wherein, in an event that first process with communication among the operation processing apparatuses in the first computation protocol is executed and then second process with communication among the operation processing apparatuses is executed, the one or more processors are configured to arrange the confidentiality securing protocol between the first process and the second process.

4. The information processing apparatus according to claim 1,
wherein each of the plurality of operation processing apparatuses:
has a shared value obtained based on distribution of each of the plurality of input values, and
execute the secure computation protocol based on the shared value.

5. The information processing apparatus according to claim 4,
wherein the confidentiality securing protocol is a re-distribution protocol that transforms the shared values to different shared values.

6. The information processing apparatus according to claim 5,
wherein the one or more processors are configured to arrange the re-distribution protocol after at least any one of steps of processing with communication of the shared values among the operation processing apparatuses in the first computation protocol.

7. The information processing apparatus according to claim 5,
wherein, in an event that first process with communication of the shared values among the operation processing apparatuses in the first computation protocol is executed and then second process with communication of the shared values among the operation processing apparatuses is executed, the one or more processors are configured to arrange the confidentiality securing protocol between the first process and the second process.

8. The information processing apparatus according to claim 1,
wherein the one or more processors are configured to:
decompose the computation expression to basic operation process which is a basic unit of operation, and
assign a basic operation protocol that corresponds to the basic operation process to the decomposed computation expression.

9. The information processing apparatus according to claim 8,
wherein the basic operation process is one of addition and/or multiplication on a ring of integers.

10. The information processing apparatus according to claim 1,
wherein the operation processing apparatuses and the information processing apparatus are formed integrally.

11. The information processing apparatus according to claim 1,
wherein the input values are medical information that is managed in mutually different systems, and
wherein in the secure computation protocol, a statistical value of the medical information is computed.

12. The information processing apparatus according to claim 1,
wherein the input values are purchase history information on user's purchase of products, wherein the information is managed in mutually different systems, and
wherein, in the secure computation protocol, a preference of the user is analyzed on the basis of the purchase history information.

13. The information processing apparatus according to claim 1,
wherein the input values are bid price information that is inputted by a plurality of bidders in an auction, and
wherein in the secure computation protocol, at least one of a highest bid price and a successful bidder of a target product is decided on the basis of the bid price information.

14. An information processing method, comprising:
generating, by a processor, a first computation protocol that excludes a confidentiality securing protocol that is executed to maintain confidentiality of a plurality of input values on the basis of a secure computation protocol in which a plurality of operation processing apparatuses compute an output value on the basis of the input values;

generating, by the processor, a second computation protocol that arranges the confidentiality securing protocol to a position at which the confidentiality of the plurality of input values is secured in the first computation protocol;

decomposing, by the processor, a computation expression to certain operation process, wherein the computation expression is used for computation in the secure computation protocol; and assigning, by the processor, to the decomposed computation expression, an operation protocol that corresponds to the certain operation process and further excludes the confidentiality securing protocol.

15. A non-transitory computer-readable storage medium, having stored thereon, instructions for causing a computer to execute operations, comprising:

generating a first computation protocol that excludes a confidentiality securing protocol that is executed to maintain confidentiality of a plurality of input values on the basis of a secure computation protocol in which a plurality of operation processing apparatuses compute an output value on the basis of the input values; and generating a second computation protocol that arranges the confidentiality securing protocol to a position at which the confidentiality of the plurality of input values is secured in the first computation protocol;

decomposing a computation expression to certain operation process, wherein the computation expression is used for computation in the secure computation protocol; and assigning, to the decomposed computation expression, an operation protocol that corresponds to the certain operation process and further excludes the confidentiality securing protocol.

16. An information processing apparatus, comprising:
one or more processors configured to:
generate a first computation protocol that excludes a confidentiality securing protocol that is executed to maintain confidentiality of a plurality of input values on the basis of a secure computation protocol in which a plurality of operation processing apparatuses compute an output value on the basis of the input values; and generate a second computation protocol that arranges the confidentiality securing protocol to a position at which the confidentiality of the plurality of input values is secured in the first computation protocol, wherein each of the plurality of operation processing apparatuses:
has a shared value obtained based on distribution of each of the plurality of input values, and
execute the secure computation protocol based on the shared value;

wherein the confidentiality securing protocol is a re-distribution protocol that transforms the shared values to different shared values; and wherein the one or more processors are further configured to arrange the re-distribution protocol after at least any one of steps of processing with communication of the shared values among the operation processing apparatuses in the first computation protocol.

17. An information processing apparatus, comprising:
one or more processors configured to:
generate a first computation protocol that excludes a confidentiality securing protocol that is executed to maintain confidentiality of a plurality of input values on the basis of a secure computation protocol in which a plurality of operation processing apparatuses compute an output value on the basis of the input values; and generate a second computation protocol that arranges the confidentiality securing protocol to a position at which the confidentiality of the plurality of input values is secured in the first computation protocol, wherein the one or more processors are further configured to:
decompose a computation expression to certain operation process, wherein the computation expression is used for computation in the secure computation protocol, and
assign, to the decomposed computation expression, an operation protocol that corresponds to the certain operation process and exclude the confidentiality securing protocol, wherein the one or more processors are further configured to:
decompose the computation expression to basic operation process which is a basic unit of operation, and
assign a basic operation protocol that corresponds to the basic operation process to the decomposed computation expression, and wherein the basic operation process is any of addition and multiplication on a ring of integers.

* * * * *